(12) United States Patent　(10) Patent No.: US 11,994,365 B2
Curzan et al.　(45) Date of Patent: *May 28, 2024

(54) PROJECTILE TRACKING AND 3D TRACEBACK METHOD

(71) Applicant: Cyan Systems, Santa Barbara, CA (US)

(72) Inventors: Jon Paul Curzan, Arroyo Grande, CA (US); John Caulfield, Santa Barbara, CA (US)

(73) Assignee: Cyan Systems, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,569

(22) Filed: Aug. 3, 2022

(65) Prior Publication Data

US 2023/0324145 A1　Oct. 12, 2023

Related U.S. Application Data

(63) Continuation of application No. 16/856,517, filed on Apr. 23, 2020, now Pat. No. 11,448,483.

(Continued)

(51) Int. Cl.
　　*G06T 7/20*　　(2017.01)
　　*F41G 3/14*　　(2006.01)
　　(Continued)

(52) U.S. Cl.
　　CPC ............. *F41G 3/142* (2013.01); *G06T 7/20* (2013.01); *G06T 7/70* (2017.01); *G06T 11/00* (2013.01);
　　(Continued)

(58) Field of Classification Search
　　CPC . F41G 3/142; F41G 3/147; G06T 7/70; G06T 7/20; G06T 11/00;
　　(Continued)

(56) References Cited

U.S. PATENT DOCUMENTS 3,699,341 A　10/1972　Quillinan
3,936,822 A　2/1976　Hirschberg
(Continued)

FOREIGN PATENT DOCUMENTS

CN　101574567　8/2011
CN　103091249　5/2013
(Continued)

OTHER PUBLICATIONS

Allison Barrie, Sniper Detectors Coming to America's Heartland, FOX Firepower, Dec. 22, 2011.
(Continued)

*Primary Examiner* — Syed Haider
(74) *Attorney, Agent, or Firm* — Van Pelt, Yi & James LLP

(57) ABSTRACT

Techniques for tracing back a projectile to the projectile origin are described. A method includes detecting projectile track(s) in image(s). Each projectile track crosses multiple pixels in each image. The projectile track(s) correspond to projectile(s). The projectile track(s) in the image(s) are translated to traceback path(s). The traceback path includes a known location and a projectile origin (e.g. the location at which the projectile originated, also termed the shooter's location).

15 Claims, 14 Drawing Sheets

Related U.S. Application Data

(60) Provisional application No. 62/840,123, filed on Apr. 29, 2019.

(51) Int. Cl.
  *G06T 7/70* (2017.01)
  *G06T 11/00* (2006.01)
  *H04N 23/695* (2023.01)

(52) U.S. Cl.
  CPC . *H04N 23/695* (2023.01); *G06T 2207/10048* (2013.01)

(58) Field of Classification Search
  CPC ........... G06T 2207/10048; G06T 2207/30212; H04N 5/23299; H04N 23/695; H04N 5/33; H04N 25/79
  See application file for complete search history.

(56) References Cited

U.S. PATENT DOCUMENTS

| | | |
|---|---|---|
| 4,684,812 A | 8/1987 | Tew |
| 4,779,004 A | 10/1988 | Tew |
| 4,780,719 A | 10/1988 | Frei |
| 4,917,490 A | 4/1990 | Schaffer, Jr. |
| 5,196,689 A | 3/1993 | Sugita |
| 5,246,868 A | 9/1993 | Busch |
| 5,473,162 A | 12/1995 | Busch |
| 5,504,717 A | 4/1996 | Sharkey |
| 5,596,509 A | 1/1997 | Karr |
| 5,612,676 A | 3/1997 | Plimpton |
| 5,629,522 A | 5/1997 | Martin |
| 5,703,835 A | 12/1997 | Sharkey |
| 5,796,474 A | 8/1998 | Squire |
| 5,973,998 A | 10/1999 | Showen |
| 6,178,141 B1 | 1/2001 | Duckworth |
| 6,357,158 B1 | 3/2002 | Smith, III |
| 6,449,540 B1 | 9/2002 | Rayner |
| 6,496,593 B1 | 12/2002 | Krone, Jr. |
| 6,819,495 B2 | 11/2004 | Shani |
| 6,840,342 B1 | 1/2005 | Hahn |
| 6,847,587 B2 | 1/2005 | Patterson |
| 6,965,541 B2 | 11/2005 | Apin |
| 6,985,337 B2 | 1/2006 | Dieny |
| 7,114,846 B2 | 10/2006 | Tominaga |
| 7,139,222 B1 | 11/2006 | Baxter |
| 7,266,045 B2 | 9/2007 | Baxter |
| 7,409,899 B1 | 8/2008 | Beekman |
| 7,411,865 B2 | 8/2008 | Calhoun |
| 7,420,878 B2 | 9/2008 | Holmes |
| 7,423,272 B2 | 9/2008 | Hasegawa |
| 7,474,589 B2 | 1/2009 | Showen |
| 7,532,542 B2 | 5/2009 | Baxter |
| 7,551,059 B2 | 6/2009 | Farrier |
| 7,586,812 B2 | 9/2009 | Baxter |
| 7,599,252 B2 | 10/2009 | Showen |
| 7,602,329 B2 | 10/2009 | Manderville |
| 7,646,419 B2 | 1/2010 | Cernasov |
| 7,688,679 B2 | 3/2010 | Baxter |
| 7,696,919 B2 | 4/2010 | Moraites |
| 7,710,278 B2 | 5/2010 | Holmes |
| 7,719,428 B2 | 5/2010 | Fisher |
| 7,732,771 B2 | 6/2010 | Hasegawa |
| 7,750,814 B2 | 7/2010 | Fisher |
| 7,751,282 B2 | 7/2010 | Holmes |
| 7,755,495 B2 | 7/2010 | Baxter |
| 7,796,470 B1 | 9/2010 | Lauder |
| 7,855,935 B1 | 12/2010 | Lauder |
| 7,947,954 B2 | 5/2011 | Snider |
| 7,961,550 B2 | 6/2011 | Calhoun |
| 8,036,065 B2 | 10/2011 | Baxter |
| 8,049,659 B1 | 11/2011 | Sullivan |
| 8,063,773 B2 | 11/2011 | Fisher |
| 8,111,289 B2 | 2/2012 | Zruya |
| 8,134,889 B1 | 3/2012 | Showen |
| 8,170,731 B2 | 5/2012 | Martinez |
| 8,212,210 B2 | 7/2012 | Hargel |
| 8,325,563 B2 | 12/2012 | Calhoun |
| 8,334,770 B2 | 12/2012 | Gurton |
| 8,351,297 B2 | 1/2013 | Lauder |
| 8,369,184 B2 | 2/2013 | Calhoun |
| 8,421,015 B1 | 4/2013 | Scott |
| 8,483,567 B2 | 7/2013 | Armentrout |
| 8,748,816 B2 | 6/2014 | Kooijman |
| 8,809,787 B2 | 8/2014 | Tidhar |
| 8,825,562 B2 | 9/2014 | Walker |
| 8,868,288 B2 | 10/2014 | Plante |
| 8,880,279 B2 | 11/2014 | Plante |
| 8,892,310 B1 | 11/2014 | Palmer |
| 8,904,689 B2 | 12/2014 | Kountotsis |
| 8,955,421 B1 | 2/2015 | Kountotsis |
| 8,970,706 B2 | 3/2015 | Scott |
| 8,981,989 B2 | 3/2015 | Gould |
| 8,989,959 B2 | 3/2015 | Plante |
| 8,995,227 B1 | 3/2015 | Johnson |
| 8,996,240 B2 | 3/2015 | Plante |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,234,963 B2 | 1/2016 | Rakeman |
| 9,294,690 B1 | 3/2016 | Caulfield |
| 9,402,060 B2 | 7/2016 | Plante |
| 9,472,029 B2 | 10/2016 | Plante |
| 9,488,442 B2 | 11/2016 | Varga |
| 9,501,878 B2 | 11/2016 | Jason |
| 9,545,881 B2 | 1/2017 | Plante |
| 9,554,080 B2 | 1/2017 | Plante |
| 9,566,910 B2 | 2/2017 | Plante |
| 9,594,371 B1 | 3/2017 | Palmer |
| 2003/0232297 A1 | 12/2003 | Pareek |
| 2004/0057121 A1 | 3/2004 | Shani |
| 2004/0208223 A1 | 10/2004 | Tominaga |
| 2005/0224716 A1 | 10/2005 | Armentrout |
| 2005/0285953 A1 | 12/2005 | Hasegawa |
| 2006/0049930 A1 | 3/2006 | Zruya |
| 2006/0078037 A1 | 4/2006 | Lee |
| 2006/0113458 A1 | 6/2006 | Yang |
| 2007/0040062 A1 | 2/2007 | Lau |
| 2007/0170359 A1 | 7/2007 | Syllaios |
| 2008/0106727 A1 | 5/2008 | Cernasov |
| 2008/0136626 A1 | 6/2008 | Hudson |
| 2008/0291075 A1 | 11/2008 | Rapanotti |
| 2009/0080700 A1 | 3/2009 | Lau |
| 2009/0121925 A1 | 5/2009 | Scott |
| 2009/0260511 A1 | 10/2009 | Melnychuk |
| 2009/0276110 A1 | 11/2009 | Martinez |
| 2009/0290019 A1 | 11/2009 | Mcnelis |
| 2009/0292467 A1 | 11/2009 | Mcnelis |
| 2009/0294666 A1 | 12/2009 | Hargel |
| 2009/0320348 A1 | 12/2009 | Kelly |
| 2010/0027840 A1* | 2/2010 | Roberts .................. G06T 7/246 382/103 |
| 2010/0079280 A1 | 4/2010 | Lacaze |
| 2010/0182482 A1 | 7/2010 | Tanaka |
| 2010/0208339 A1 | 8/2010 | Kleppe |
| 2010/0226210 A1 | 9/2010 | Kordis |
| 2010/0245644 A1 | 9/2010 | Ellis-Monaghan |
| 2011/0025521 A1 | 2/2011 | Gurton |
| 2011/0095187 A1 | 4/2011 | Snider |
| 2011/0170798 A1 | 7/2011 | Tidhar |
| 2011/0261193 A1* | 10/2011 | Agurok .................. G01J 5/60 348/135 |
| 2011/0315767 A1 | 12/2011 | Lowrance |
| 2013/0088594 A1 | 4/2013 | Wyles |
| 2013/0140433 A1 | 6/2013 | Oggier |
| 2013/0308939 A1 | 11/2013 | Armentrout |
| 2015/0192667 A1 | 7/2015 | Rakeman |
| 2016/0232774 A1 | 8/2016 | Noland |
| 2016/0313441 A1* | 10/2016 | Tuxen .................... G01S 13/72 |
| 2017/0123487 A1 | 5/2017 | Hazra |
| 2017/0318238 A1 | 11/2017 | Sugiyama |

(56) References Cited

U.S. PATENT DOCUMENTS

| | | |
|---|---|---|
| 2019/0064310 A1 | 2/2019 | Tsang |
| 2019/0124264 A1 | 4/2019 | Kogure |
| 2019/0379852 A1 | 12/2019 | Akabori |

FOREIGN PATENT DOCUMENTS

| | | |
|---|---|---|
| CN | 102486709 | 12/2014 |
| CN | 107077020 | 8/2017 |
| EP | 1122508 | 10/2005 |
| EP | 2533001 | 12/2012 |
| EP | 2911092 | 8/2015 |
| IL | 169836 | 11/2010 |
| JP | 2019216315 | 12/2019 |
| WO | 2000019052 | 4/2000 |
| WO | 2004008403 | 1/2004 |
| WO | 2005045380 | 5/2005 |
| WO | 2007088552 | 8/2007 |
| WO | 2007107988 | 9/2007 |
| WO | 2008060257 | 5/2008 |
| WO | 2009102310 | 8/2009 |
| WO | 2016142549 | 9/2016 |

OTHER PUBLICATIONS

Andrew White, Fighting Fire with Fire: Technology Finds a Solution to Sniper Attacks, Jane's International Defence Review, Jun. 2009, pp. 52-57.
Andy Nativi, AW I Countersniper Systems Detect Hidden Shooters, Defense & Aerospace News, News from the Defense & Aerospace Industry, Dec. 22, 2011, pp. 1-3.
Arnold Goldberg, Infrared Signatures of the Muzzle Flash of a 120mm Tank Gun and their Implications for the Kinetic Energy Active Protection System (KEAPS), Army Research Laboratory, ARL-TR-909, Oct. 2001.
Asfaw et al., Impact of Pose and Glasses on Face Detection Using the Red Eye Effect, Mar. 2003.
Associated Press, Infrared Detects Sniper Gunfire, WIRED, Associated Press, Science, Oct. 29, 2005.
Author Unknown, Infantry: Sniper Detectors Arrive, Aug. 22, 2009, Strategy World.
Author Unknown, SLD500 Sniper Locator, May 11, 2006.
Brown et al., Ku-Band Retrodirective Radar for Ballistic Projectile Detection and Tracking, IEEE, 2009, pp. 1-4.
Callan et al., Sensors to Support the Soldier, Feb. 3, 2005, pp. 1-101.
Caulfield et al., Small Pixel Infrared Sensor Technology, Proceedings of SPIE 10177, Infrared Technology and Applications XLIII, 1017725 (May 3, 2017).
Chris Hughes, British Troops to get iPod-Sized "Sniper Finders" to take on Deadly Sharpshooters in Afghanistan, Mar. 8, 2011.
David Crane, Anti-Sniper/Sniper Detection/Gunfire Detection Systems at a Glance, Defensereview.com, Jul. 19, 2006.
David Crane, Torrey Pines Logic Mirage—1200 and Myth-350 Handheld Sniper Detection Systems, Defensereview.com, Dec. 8, 2008.
Douglas et al., The Objective Force Soldier/Soldier Team, Army Science Board, FY2001 Summer Study, Final Report, vol. II The Science and Technology Challenges, Nov. 2001.
Duckworth et al., Fixed and Wearable Acoustic Counter-Sniper Systems for Law Enforcement, SPIE Conference on Sensors, C3I, Information, and Training Technologies for Law Enforcement, Boston MA, Nov. 1998.
Ertem et al., An Acoustic Sensor for the Viper Infrared Sniper Detection System, Aug. 1999.
Francis Flinch, Wikipedia, User Talk: Francis Flinch, Apr. 10, 2019, p. 1-32.
IRobot, Combat-Proven Robot to be Equipped with Enhanced Laser, Optical & Acoustic Systems, iRobot and Boston Univ. Photonics Center Unveil Advanced Sniper Detection System for iRobot PackBot, Oct. 3, 2005.
John Keller, Sniper-Detection Systems to Provide Perimeter Security for Army Forces in Afghanistan to come from Raytheon BBN, Feb. 15, 2011.
Law et al., Multi-Spectral Signature Analysis Measurements of Selected Sniper Rifles and Small Arms, Proc. SPIE 2938, Command, Control, Communications, and Intelligence Systems for Law Enforcement, (Feb. 18, 1997), pp. 288-298.
Li et al., Real-Time Tracking of Bullet Trajectory Based on Chirp Transform in a Multi-Sensor Multi-Frequency Radar, Center for Advanced Communications, Villanova University, IEEE 2010, pp. 1203-1207.
Michael Naimark, How to ZAP a Camera: Using Lasers to Temporarily Neutralize Camera Sensors, Camera Zapper, Oct. 2002.
Moroz et al., Airborne Deployment of and Recent Improvements to the Viper Counter Sniper System, 1999, Naval Research Laboratory.
Nigel F. Evans, British Artillery Fire Control Ballistics & Data, Apr. 28, 2014.
Noah Shachtman, Lasers Stop Snipers Before They Fire (updated), Apr. 26, 2007.
Peter A. Buxbaum, Pinpointing Sniper Perches, Aug. 2010, SOTECH 8.6, pp. 11-14.
Rafael, Anti-Sniper Systems Finding Their Range, Defense Industry Daily, Nov. 3, 2005.
Robert D. Fiete, Image Quality and AFN/p for Remote Sensing Systems, Opt. Eng. 38 (7), pp. 1229-1240, (1999).
Scanlon et al., Networked Acoustic Sensor Array's Performance During 2004 Horizontal Fusion—Warrior's Edge Demonstration, Dec. 2004, US Army Research Laboratory, pp. 1-8.
Simon et al., Sensor Network-Based Countersniper System, SenSys'04, Nov. 3-5, 2004.
Simonis et al., Nanotechnology, Innovation Opportunities for Tomorrow's Defence, TNO Science & Industries, Mar. 2006.
Tim Hornyak, U.S. Troops Getting Wearable Gunshot Detectors, A Shoulder-Mounted Unit with Four Acoustic Sensors and a Chest Display that Attaches to Body Armor can Show the Direction and Distance of Sniper Fire in a Fraction of a Second, Mar. 21, 2011.
Tina Cipara, Using Radar Signals to Safeguard our Troops, Mason Research, Mar. 15, 2011.
Tom Vanden Brook, High-Tech Device Helps U.S. Troops Pinpoint Snipers, USA Today, Mar. 2, 2011.
Torrey Pines Logic, Product Release, New Mini Thermal Zoom Imagers from Torrey Pines Logic—The New T12 is Small Enough for a Pistol with all the Features of Larger More Expensive Imagers, Nov. 3, 2015.
W.E. Tennant, "Rule 07" Revisited: Still a Good Heuristic Predictor of p/n HgCdTe Photodiode Performance?, Journal of Electronic Materials, vol. 39, No. 7, 2010.
Wikipedia, External Ballistics, Dec. 2, 2018.
Wikipedia, External Ballistics, Jan. 31, 2012.
Wikipedia, Talk: External Ballistics, Jun. 5, 2015.
Zhang et al., Real-Time Acquisition and Tracking of Sniper Bullets using Multi-Sensor Multi-Frequency Radar Techniques, Center for Advanced Communications, Villanova University, IEEE, 2009, pp. 265-268.

* cited by examiner

500

600

PROJECTILE TRACKING AND 3D TRACEBACK METHOD

CROSS REFERENCE TO OTHER APPLICATIONS

This application is a continuation of U.S. patent application Ser. No. 16/856,517 entitled PROJECTILE TRACKING AND 3D TRACEBACK METHOD filed Apr. 23, 2020, which claims priority to U.S. Provisional Patent Application No. 62/840,123 entitled PROJECTILE TRACKING AND 3D TRACEBACK METHOD filed Apr. 29, 2019, both which are incorporated herein by reference for all purposes.

GOVERNMENT SUPPORT

This invention was made with support under contract FA8651-19-C-0021 awarded by the Airforce Research Laboratory. The government has certain rights in the invention.

BACKGROUND OF THE INVENTION

Existing methods for hostile fire detection and shooter location have significant drawbacks. For example, muzzle flash detection requires that the shooter is in line of sight of the sensor, the shooter is not using flash suppression on the firearm, and the distance to shooter is relatively close. Further a shooter might hide in a building, behind a tree, or other solid object so that the muzzle flash is not observable. Consequently, muzzle flash detection may be unable to locate the source of a projectile such as a bullet. Acoustic detection methods typically require numerous microphone sensors with precise relative alignment, complex processing and humans-in-the-loop to assist in discriminating false signatures. Acoustic detection methods may also require that the shooter is relatively close to the sensors for detection of the audible muzzle blast or that the projectile passes relatively close to the sensors for a shockwave to trigger a sensing threshold and overcome background noise. Existing imaging detection methods may require the use of a narrow field of view (NFOV) lens in order to detect objects the size of bullets. In such cases, bullets may be a point source in a single or a few pixels. This limits the camera's detection cone. Thus, imaging detection methods using infrared radiation (IR) cameras may be limited to two-dimensional localization within an imaged, NFOV.

BRIEF DESCRIPTION OF THE DRAWINGS

Various embodiments of the invention are disclosed in the following detailed description and the accompanying drawings.

DETAILED DESCRIPTION

Figure 1:
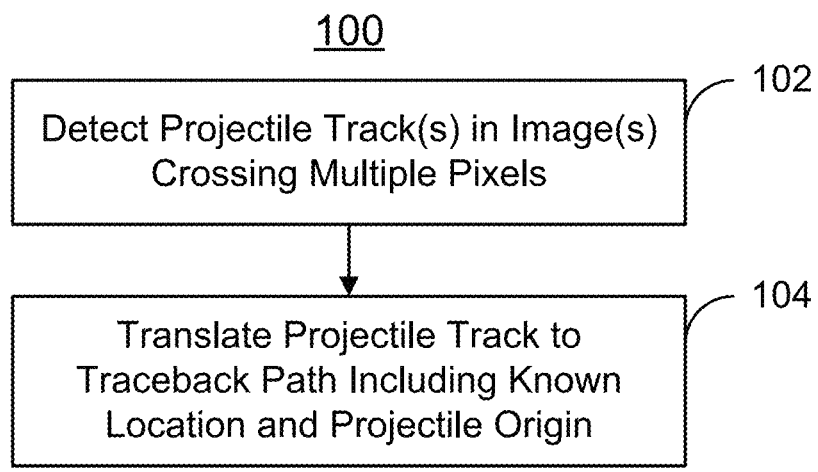
FIG. 1 is a flow chart depicting an exemplary embodiment of a method for providing a traceback path for a projectile using image(s).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Existing methods for hostile fire detection and shooter location include muzzle flash sensing, acoustic sensing and infrared radiation (IR) imaging. Each method has significant drawbacks. For muzzle flash, the shooter must be in line of sight of the sensor, the shooter must not be using flash suppression on the firearm, and the distance to shooter must be relatively close to detect and identify the firearm signature. Further, solar glint and/or optical clutter can lead to false positives. A single detection within a sensor image may not provide the distance to the shooter and may not provide the path of the projectile. Muzzle flash reflections off of other objects can aid detection but can also lead to inaccurate heading to the shooter. Further a shooter might hide in a building, behind a tree, or other solid object to evade detection, so that the muzzle flash is non observable.

Although acoustic mechanisms exist for tracing back projectiles to shooters, such mechanisms also have drawbacks. Acoustic methods generally require a large number of microphone sensors with a precise relative alignment. Moreover, complex, human-assisted processing may be required to prevent false signatures. The shooter or projectile must be relatively close to the sensors to trigger detection. Such a mechanism may also be slow (e.g. requiring several to many seconds), which delays the response time for countermeasures.

Existing IR imaging methods for small arms fire localization and tracking require a narrow field of view (NFOV) lens in order to detect objects the size of bullets. This limits the detection cone of the IR detector. Such IR imaging methods may also be limited to performing a 2D localization within a narrow FOV of the image.

Techniques for traceback of projectiles are described. Although discussed in the context of projectiles such as bullets, the techniques described herein apply to other projectiles, including but not limited to bullets, missiles, rockets, munitions, ultrasonic and hypersonic projectiles, and/or other projectiles. Thus, a variety of projectiles may be traced back to identify the point of origin. The techniques described herein may be used for small or large projectiles. The techniques are also described in the context of particular IR detection systems. However, other detections systems may be used with the methods described herein. Further, the techniques are described in terms of planes, paths, lines and angles. It is understood that these are ideal geometric features corresponding to the real world. For example, a traceback path is defined as an intersection of two planes and including the point of origin of the projectile. However, the traceback path has some inherent width and error (e.g. five percent or less in some embodiments), and the point of origin may be within some range of the traceback path corresponding to the error.

In some embodiments, the method includes detecting projectile track(s) in image(s). Each projectile track crosses multiple pixels in each image. The projectile track(s) correspond to projectile(s). In some embodiments, the each projectile track is resolvable such that three dimensional computation of the flight path is possible. For example, the distance to the projectile may be determined. The projectile track(s) in the image(s) are translated to traceback path(s). The traceback path includes a known location (e.g. the location of the image detection system) and a projectile origin (e.g. the location at which the projectile originated, also termed the shooter's location).

In some embodiments, translating the projectile track(s) to traceback paths includes multiple processes. The translating may start with one or more images including at least one projectile track. Image plane(s) normal to an optical axis are identified for the image(s). Each projectile track is represented in the image plane by a line segment. Intercepts for the line segment of each projectile track are determined. In some embodiments, the intercepts are the points at which the line segment intersects the horizontal and vertical midlines of the image. The intercepts may be outside of the borders of the image. The projectile plane is defined for each line segment. The projectile plane includes the intercepts for the line segment and the known location. In some embodiments, the known location is the location of the image detection system (e.g. a camera) capturing the image. The intersection of the projectile plane with a ground plane is determined for each line segment. The intersection corresponds to the traceback path for each projectile. In some embodiments, the traceback path is overlaid on a topographical map, which may allow improved location of the projectile origin.

In some embodiments, the rotation ("projectile plane rotation") and pitch ("projectile plane pitch") are determined for a direction perpendicular to the image plane (e.g. along the optic axis). In some embodiments, determination of the projectile plane pitch and projectile plane rotation include correcting for a camera pitch and/or a camera yaw.

In some embodiments, multiple images are utilized. Multiple images allow for improved locating of the projectile origin. For example, a first image captured at a first time and a first location and a second image captured at a second time and at a second location different from the first location may be used. A first traceback path is determined as described above for the first image. A second traceback path is determined as discussed above for the second image. The first and second traceback paths are different and both include the projectile origin. Thus, the first and second trackback paths may be used to provide the projectile origin (e.g. at the intersection of the first and second traceback paths). In some embodiments, two different detection systems are used to capture the first and second images at the same time or different times such that the time difference may be accounted for. In some embodiments, the two images are captured by a single detection system at different times and different locations. In some embodiments, each image, or frame, includes multiple subframes. In some embodiments, the detection system(s) are infrared detection system(s). Each infrared detection system includes a lens, a photodetector pixel array, and readout circuits. The photodetector pixel array includes pixels and receives a photo signal from the lens. A readout circuit of the readout circuits includes an integration capacitor, an averaging capacitor and cascaded averaging circuit(s) coupled with the averaging capacitor. The integration capacitor is coupled with a pixel of the plurality of pixels. In some embodiments, the pixel array has a pitch of less than ten micrometers. In some embodiments, the pitch of the pixel array is not more than five micrometers. In some embodiments, such a detection system may capture a wide field of view. Further, the detection system may provide images allowing the projectile trajectory to be resolved and the three-dimensional (3D) computation of the flight path. The distance over which this is possible is limited by camera's ability to detect the projectile and resolve the projectile track at some point along its trajectory.

Figure 2:
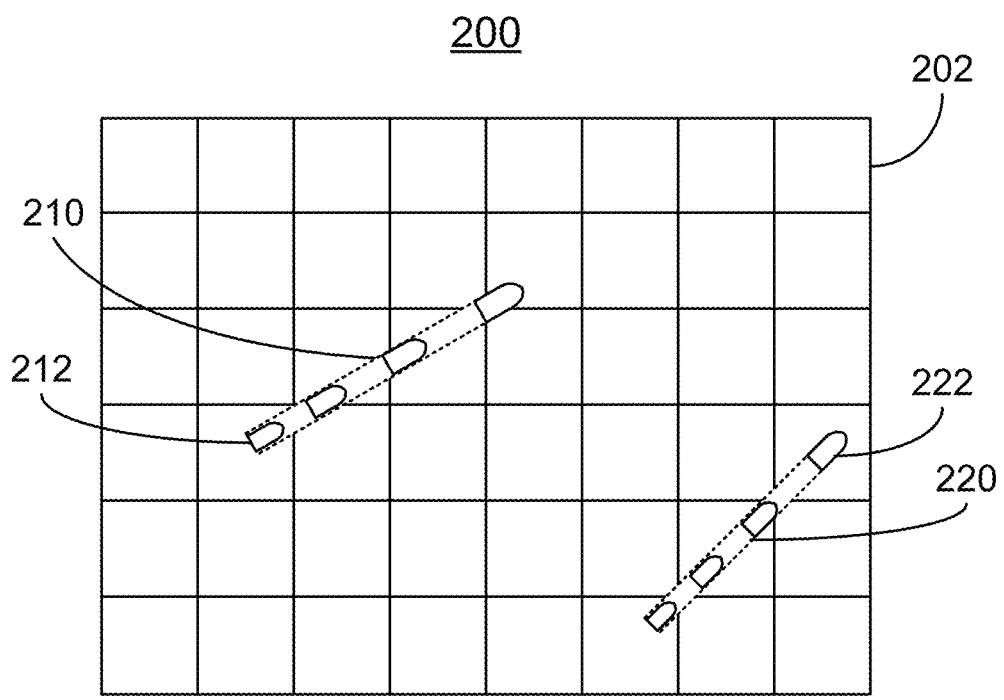
FIG. 2 is a diagram of an embodiment of an image usable in providing a traceback path for a projectile.

FIG. 1 is a flow chart depicting an exemplary embodiment of method 100 for providing a traceback path for a projectile using image(s). Method 100 may include substeps. In addition, in some embodiments, steps and/or substeps may be performed in another order, including in parallel. Method 100 utilizes one or more images for providing the traceback path. FIG. 2 is a diagram of an embodiment of a portion of image 200 usable in method 100. Image 200 may be considered to be at the image plane, so issues with diffraction in the image are not discussed. Further, image 200 is for explanatory purposes only and is not to scale. Method 100 is described in the context of image 200. Image 200 covers a solid angle of known horizontal and vertical fields of view (HFOV and VFOV). As can be seen in FIG. 2, image 200 is formed of multiple pixels 202. For clarity, only one pixel is labeled. Image 200 includes projectile tracks 210 and 220. Image 200 contains intensity information to permit the calculation of the projectile's two-dimensional flight path across the image. Each projectile track 210 and 220 corresponds to a projectile 212 and 222, respectively. For clarity, multiple versions projectiles 212 and 222 in the projectile tracks 210 and 220, respectively, are depicted. In some embodiments, an image 200, or frame, includes multiple subframes. The projectiles 212 and 222 shown may correspond to what is captured in the subframes. As can be seen in image 200, projectile tracks 210 and 220 cross multiple pixels. Further, projectile tracks 210 and 220 are resolvable in image 200. Because their projectile tracks 210 and 220 are resolvable, the motion of projectiles 212 and 222 in three dimensions can be determined. Projectiles 212 and 222 are also depicted in image 200. Thus, projectiles 212 and 222 are shown in FIG. 2 such that the shape of projectiles 212 and 222 can be seen in image 200. However, projectiles in an image may generally appear essentially as points (e.g. such that their shape cannot be determined). Consequently, projectiles, such as projectiles 212 and 222, in an image such as image 200 are generally viewable only as a point in the corresponding projectile track, such as projectile tracks 210 and 220, respectively. Such projectiles are still detectable. The corresponding projectile tracks are resolvable because the projectiles' motion through the image can be determined.

Projectile tracks in the image are detected, at 102. The projectile tracks correspond to projectiles and cross multiple pixels in each image. In some embodiments, the each projectile track in the image is resolvable such that three dimensional computation of the flight path is possible.

The projectile tracks in the images are translated to traceback paths, at 104. A traceback path includes a known location and the location at which the projectile originated (projectile origin). In some embodiments, the known location is at or near the location of the image detection system. Selecting the location of the image detection system (e.g. the camera) as the known location makes the translation simpler. However, other known locations may be used. Thus, a traceback path can be considered a heading to the projectile origin. Although the projectile origin is on the traceback path, the projectile origin is generally not determined from a single image. If multiple images captured at multiple locations, then multiple traceback paths for a single projectile can be used to identify the projectile origin.

Translating the projectile track(s) to traceback path(s) at 104 includes multiple processes. In some embodiments, the projectile track in the image is converted to a plane of possible projectile trajectories. In some embodiments, the plane includes the projectile track and the known location. The intersection of this plane with a ground plane (e.g. a plane corresponding to the known location and locally parallel to the earth's surface) can be used to provide the traceback path.

For example, method 100 may be used for image 200. In image 200, projectile tracks 210 and 220 indicate that projectiles 212 and 222 are moving left to right in the plane of the page and toward the camera (e.g. projectiles 212 and 222 are larger toward the right of image 202). However, as discussed above, small projectiles more generally appear as points in the image. Thus, in general, the size and shape of the projectiles may not be determined from the image.

Projectile tracks 210 and 220 in image 202 are detected at 102. Although only pixels 202, projectile tracks 210 and 220, and projectiles 212 and 214 are shown in FIG. 2, an image typically includes multiple features. For example, people, animals, buildings, vegetation, other projectiles and other items may be present. Thus, the projectile tracks 210 and 220 are discriminated from other features in image 200 at 102. Projectile tracks 210 and 220 are also resolvable, allowing the motion of corresponding projectiles 212 and 222 in three-dimensions to be determined. At 104, therefore, projectile tracks 210 and 220 are converted to traceback paths using planes which intersect the projectile tracks 210 and 220 and the known location, such as the image detection location.

Thus, using method 100, traceback paths to the projectile origins can be determined. As a result, the location of the shooter or other source of the projectile may be more easily determined. Locating the projectile origins may be accomplished without muzzle flash, acoustics or other mechanisms that may be difficult to accomplish and/or require knowledge of events that may be obscured. Further, the traceback path to the projectile origin can be determined without requiring the projectile origin to be within the image. In some embodiments, method 100 may also be performed without significant (or any) user intervention. Thus, method 100 provides an improved mechanism for locating source of projectiles.

Figure 3:
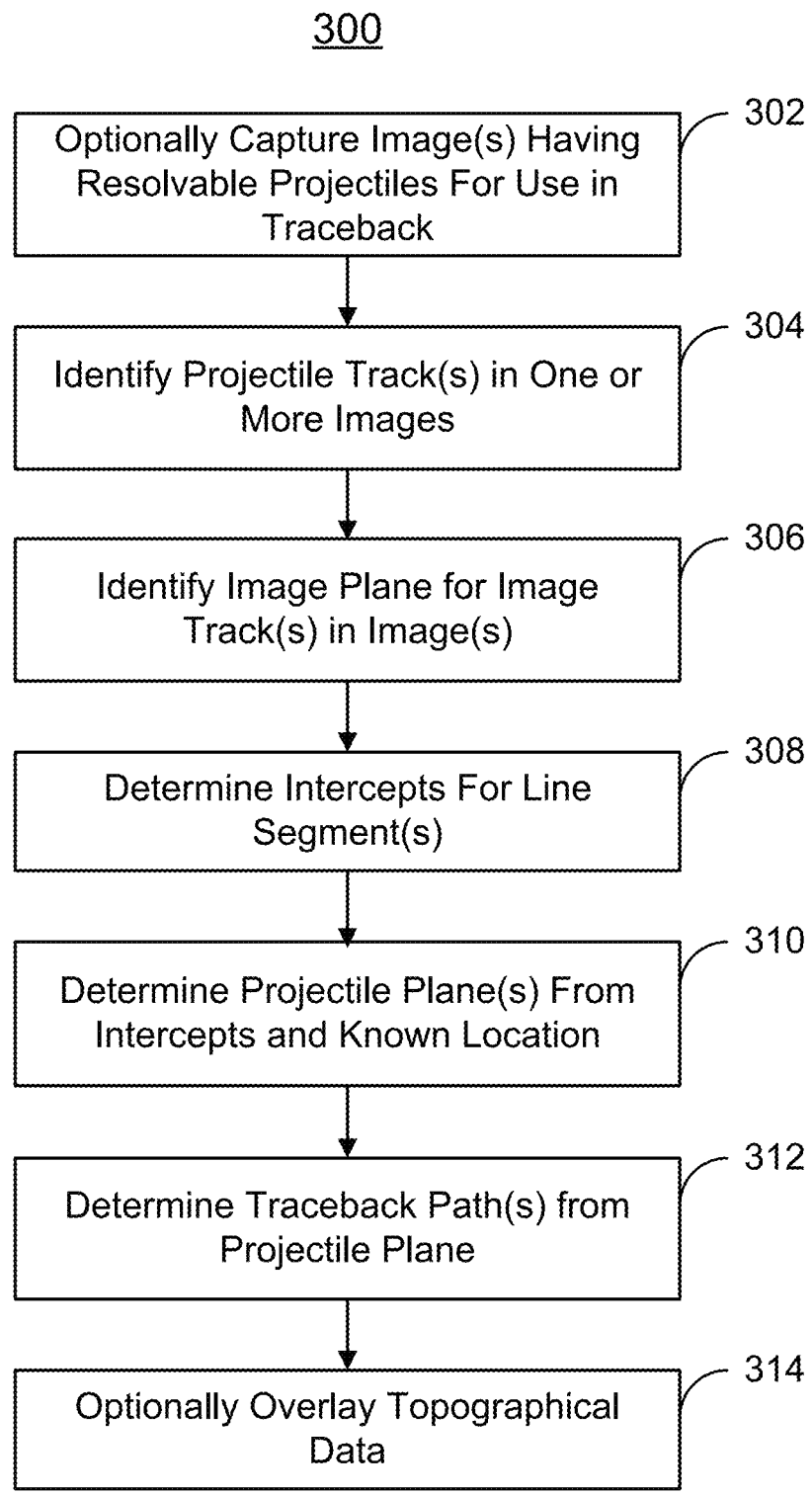
FIG. 3 is a flow chart depicting a method for providing a traceback path for a projectile using image(s).

FIG. 3 is a flow chart depicting an exemplary embodiment of method 300 for providing a traceback path for a projectile back using image(s). Method 300 may include substeps. In addition, in some embodiments, steps and/or substeps may be performed in another order, including in parallel. Method 300 utilizes one or more images for providing the traceback path. FIGS. 4A-4F are diagrams depicting an embodiment of a providing a traceback path for a projectile. Although depicted in the context of a single projectile, FIGS. 4A-6 may be generalized to multiple projectiles. Method 300 is described in the context of FIGS. 4A-4F. As described herein, method 300 considers projectiles to travel in near straight lines. In some embodiments, however, the effects of gravity or other environmental effects (e.g. prevailing wind and/or distance effects such as the curvature of the earth) may be factored in. In such embodiments, projectiles may be determined to have a curved path. In such embodiments, method 300 may be iteratively performed to estimate the traceback path to the projectile origin.

Figure 4A:
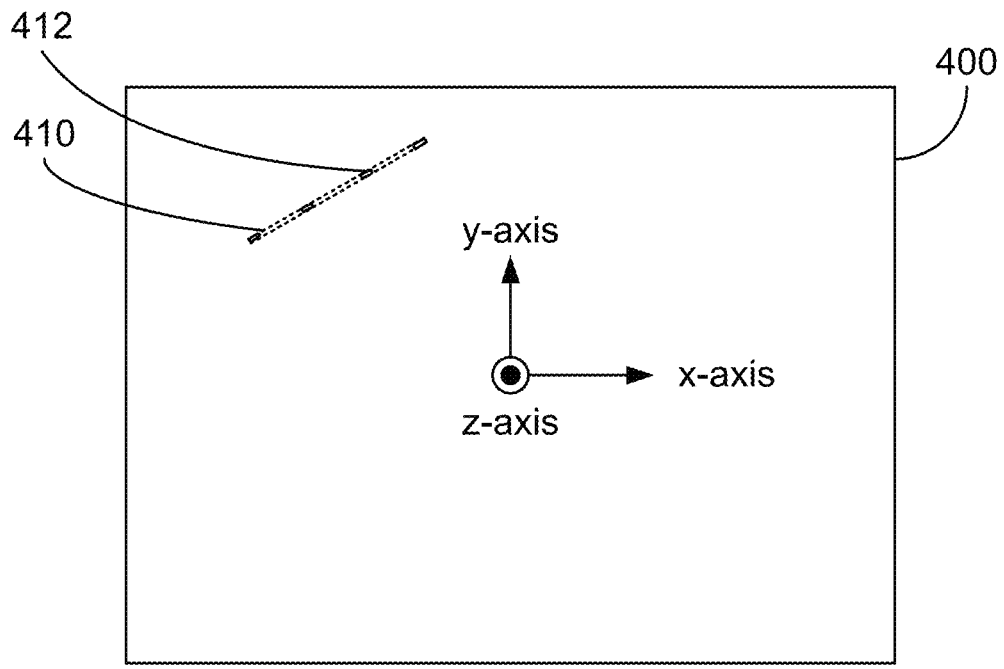
FIGS. 4A-4F are diagrams depicting an embodiment of a providing a traceback path for a projectile.

One or more images that may be used in determining the traceback paths are captured, at 302. At 302, the image detection system(s) capture images in which the projectile tracks cross multiple pixels and in which projectile tracks are resolvable (can be converted to motion by the projectiles). For example, images may be captured using one or more of the image detection systems described below. Other detection systems may be used if the image detection systems are capable of capturing images in which the paths of projectiles (e.g. bullets) can be resolved such that motion of the projectiles can be determined. In some embodiments, the images are captured at 302 by an image detection system incorporated into a system for providing traceback paths. For example, a computer system which performs method 100 and/or 300 may be coupled to the image detection system. However, in other embodiments, images used in determining the traceback paths may be provided in another manner and/or by another entity. FIG. 4A depicts one such image 400 captured at 302. Image 400 includes projectile track 410 and projectile 412. Projectile track 410 is resolvable. The x-axis and y-axis shown may correspond to the horizontal and vertical midlines of image 400. The z-axis may correspond to the optic axis. Stated differently, the optic axis stretches along a direction from a portion of the image detection system (e.g. a camera) to the image.

Projectile tracks in each image are detected, at 304. Thus, the projectile tracks are discriminated from other features in the image at 304. The image plane for each of the images is identified, at 306. The image plane identified at 306 is perpendicular to the optic axis and corresponds to the image. In some embodiments, 306 includes identifying the distance between the image plane and the image detection system(s) (e.g. the distance to the projectile along the optic axis). In such embodiments, the location of the projectile origin may be determined with a single image. However, more generally, the distance between the image plane and the image detection systems (e.g. the distance to the projectile along the optic axis) is not readily determinable from the image. In addition, the real-world projectile track is replaced in the image plane by a line segment corresponding to the projectile track at 306. A line segment replaces the projectile track because in general, projectiles travel fast enough and the image captures a small enough time interval that effects of gravity (or distance effects such as the curvature of the earth) may be negligible. However, nothing prevents the techniques described herein from being extended to parabolic projectile tracks and/or projectile tracks that are curved for other reasons, such as distance effects.

Figure 4B:
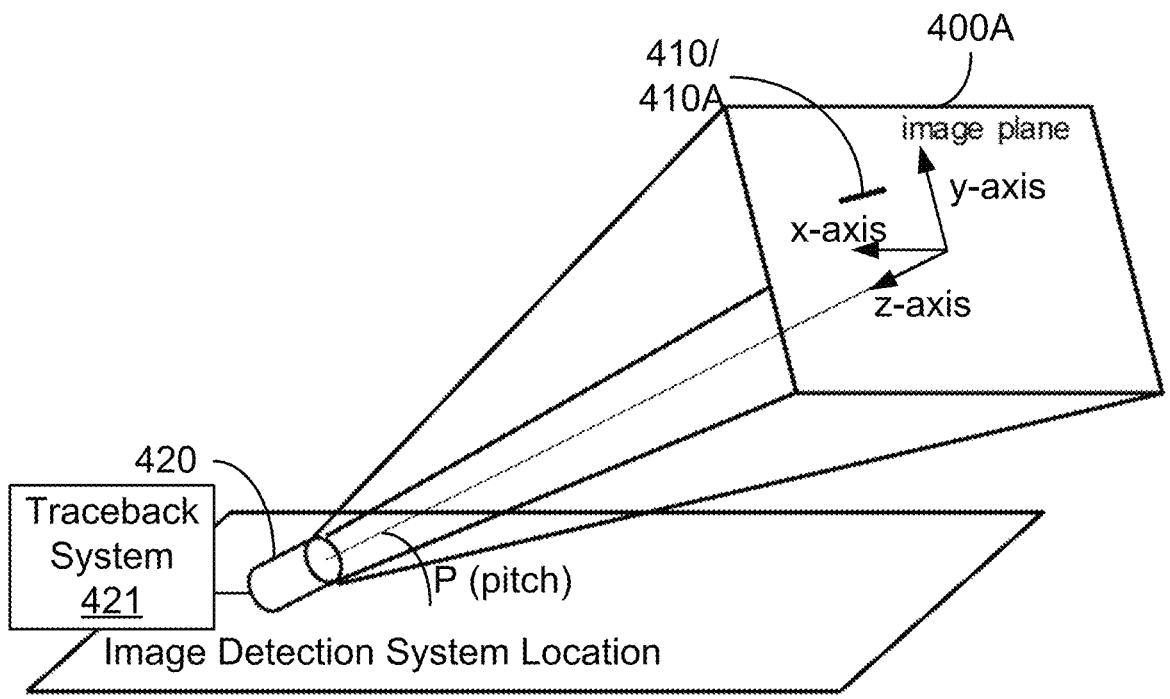

For example, FIG. 4B depicts the image plane 400A that corresponds to image 400 after 306 is completed. Line segment 410A corresponds to projectile track 410. The x-axis, y-axis and z-axis are also shown. As can be seen in FIG. 4B, the z-axis is along the optic axis to image detection system 420 (e.g. an infrared camera). Also shown is traceback system 421, which may be computer or other analogous system(s) used in determining the traceback path. For example, traceback system 421 may include an application specific integrated circuit(s) (ASIC(s)) and/or field programmable gate array(s) (FPGA(s)) which may be configured to carry out some or all of the techniques described herein. Thus, method(s) 100 and/or 300 may be performed in whole or in part using traceback system 421. The pitch, P, of image detection system 420 indicates the direction with respect to a ground plane in which the image detection system is aimed. In some embodiments, the yaw (e.g. rotation from a defined direction around a vertical axis of the image detection system) and roll (e.g. clockwise or counter-clockwise around the optic axis) of image detection system 420 is also known or determined. Thus, image plane 400A has been identified for image 400.

Intercepts for the line segment(s) are identified, at 308. In some embodiments, the intercepts are the positions at which the line segment(s) would or do cross the x-axis and y-axis. However, in other embodiments, any other two points along the line segment may be selected as intercepts at 308. The intercepts can, but need not, lie within the portion of the image plane that corresponds to the image.

Figure 4C:
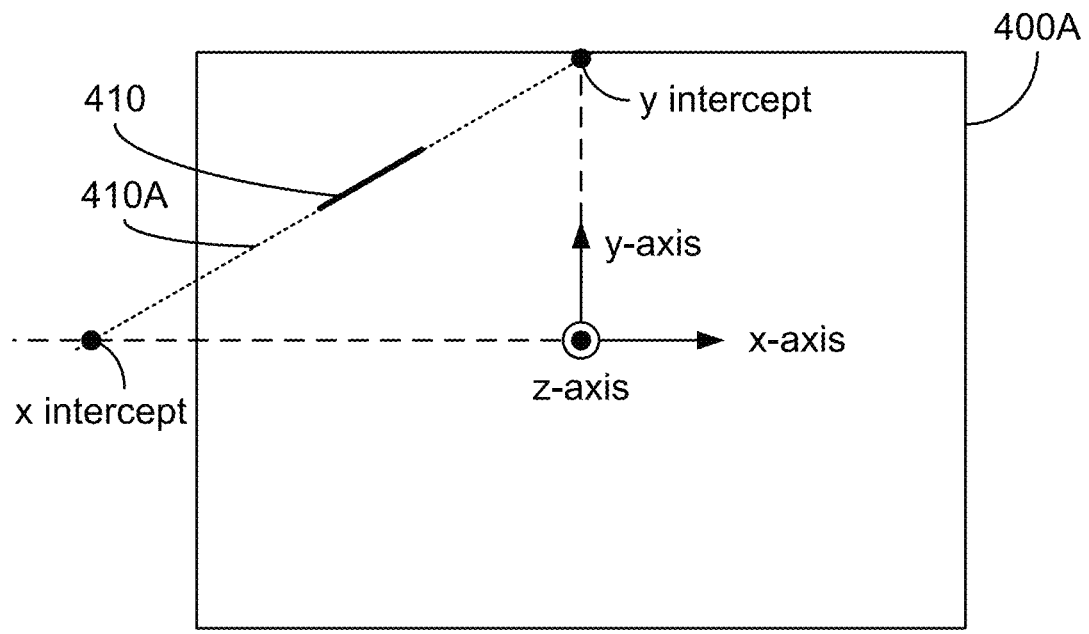

For example, FIG. 4C depicts image plane 400A after the intercepts have been determined. Also shown are line segment 410A corresponding to projectile track 410, the x-axis, the y-axis and the z-axis (corresponding to the optic axis). In the embodiment shown, the x-axis is a horizontal line demarking the midline along the vertical edge of the image plane 400A/image 400, while the y-axis is a vertical line demarking the midline along the horizontal edges of image plane 400A/image 400. However, in other embodiments, other axes may be utilized. In some embodiments, the axes need not be mutually perpendicular. As can be seen in FIG. 4C, it is possible for the x-intercept and/or y-intercept to lie outside the borders of 400 image and, therefore, outside the corresponding borders of image plane 400A.

Figure 4D:
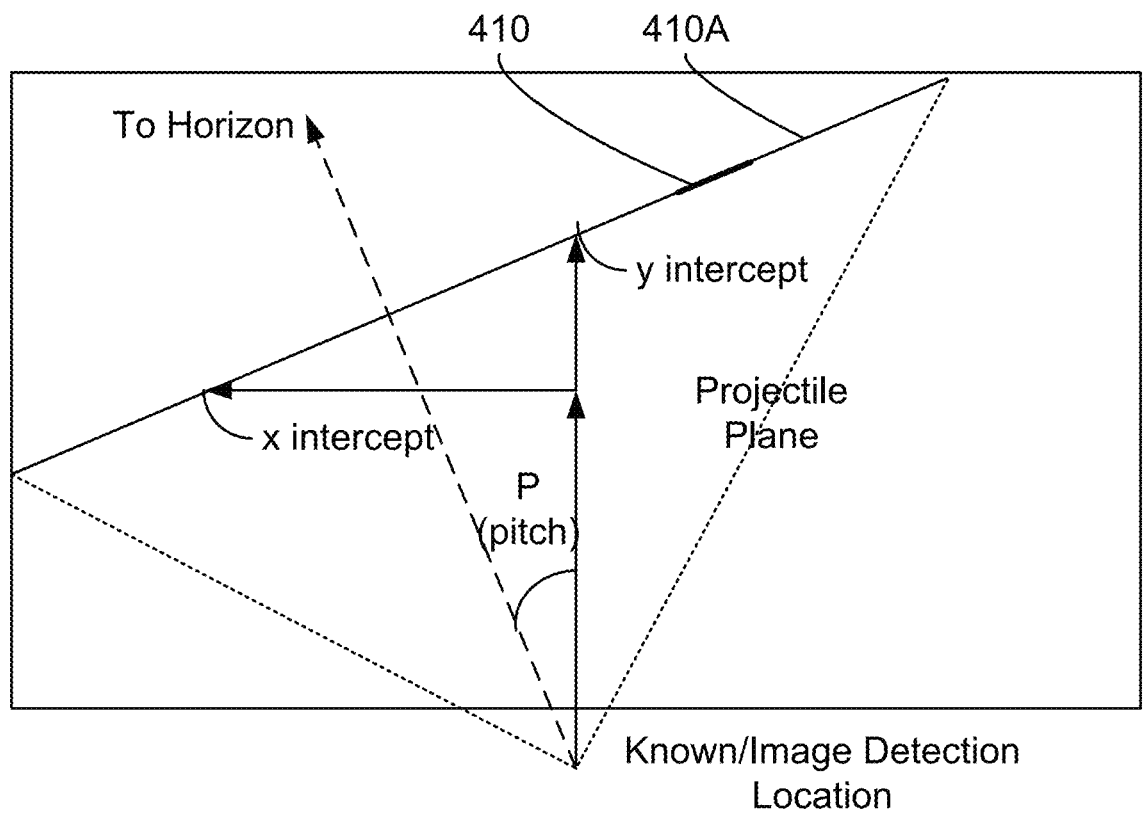

A projectile plane is defined for each line segment, at 310. The projectile plane includes and may be defined by the intercepts for the line segment and a known location. In some embodiments, the known location is the location of the image detection system that captured the image in 302 and/or is performing processing. The known location may be identified by global positioning satellite (GPS) coordinates, latitude and longitude, and/or other mechanism. Further, the direction the image detection system is aimed (e.g. the direction of the optic axis) may be part of the known location. Thus, the real-world direction of the optic axis, both the pitch and the heading (e.g. north or east) may be determined. The projectile plane may thus be identified by the intercepts and known location. Similarly, the projectile plane may be identified by a pair of angles from the known location. In some embodiments, the rotation and pitch of the projectile plane relative to the optic axis is computed and adjusted for the absolute roll, pitch and yaw of the detection system as part of 310. For example, FIG. 4D is a view including the projectile plane. Also shown is the known location, pitch (P) of the image detection system, and line segment 410A corresponding to projectile track 410 in image 400. The projectile plane is shown by the triangle including the dotted lines from the known location and the line corresponding to line segment 410A.

Figure 4E:
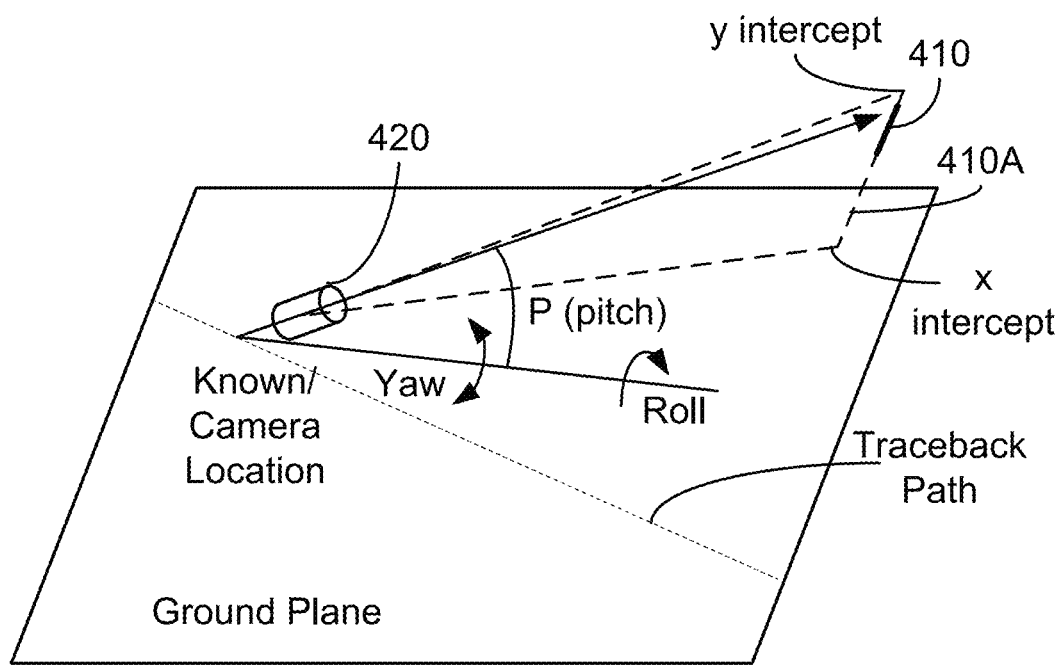

The traceback paths are determined from the projectile planes, at 312. In some embodiments, this is accomplished by determining the intersection of the projectile planes for the line segments with ground plane(s). The intersection corresponds to the traceback path for each projectile. For example, FIG. 4E is a perspective view indicating the traceback path for a particular projectile. Line segment 410A corresponds to the projectile track 410 of image 400. Also shown are the x-intercepts, y-intercept and pitch (P) for image detection system 420. The yaw and roll of image detection system 420 is zero in FIG. 4E. The projectile plane includes the location of image detection system 420, the x-intercept and the y-intercept. The projectile plane is indicated by the dashed lines including line segment 410A, the x-intercept, the y-intercept and the known location. The ground plane, which corresponds to a local ground, is also shown. In this embodiment, detection system 420 has been raised off of the ground plane. Raising image detection systems 420 off the ground shifts the ground plane behind the camera. The traceback path occurs wherein the projectile plane intersects the ground plane. The traceback path is indicated by the dotted line. The projectile origin lies somewhere on the traceback path. Thus, a direction toward the projectile origin (e.g. a shooter) may be determined.

Figure 4F:
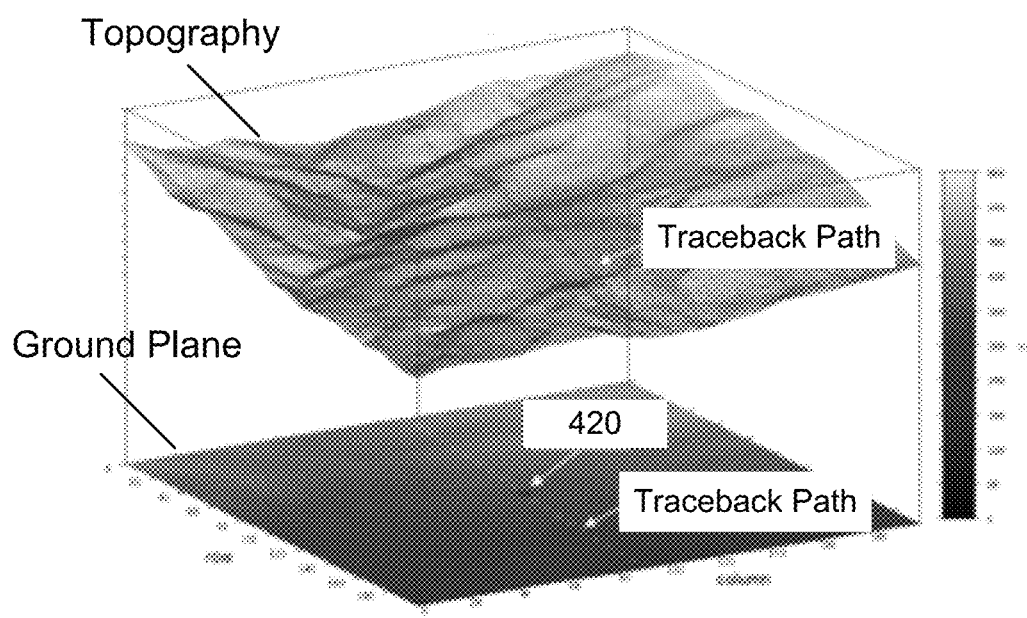

In some embodiments, the traceback path is overlaid on a topographical map, at 314. This overlay may allow for improved locating of the projectile origin. Thus, potential locations for the projectile origin may be better determined. For example, FIG. 4F depicts the trackback path for both the ground plane and the overlaid topography. Locations along the traceback path that may be unsuitable for the projectile origin, for example because they are in a deep valley, may be determined. Conversely, locations along the traceback path that are more likely, for example because they are higher and provide a shooter with a better vantage point, may be determined. In some embodiments, 314 uses three-dimensional topographic data of the surrounding area, such as the National Elevation Dataset (NED), which is readily available from the USGS for public download. This data set may provide ⅓ arc-second (about ten meters) spatial resolution with sub-meter elevation resolution. Further topographic mapping having the same or improved accuracy (e.g. ⅑ arc-second or better) allows for improved use of method 300. The projectile plane, if extended down to the ground, forms a line of origin where it intersects with the topographic map. Each point of the line coincides with an elevation point regardless of whether this point is actually within the image detection system's FOV. In other words, points on the line, including the projectile origin (e.g. the shooter location), may be outside of the horizontal view or even on the opposite side of a hill. The projectile origin need not be in direct line of sight of the image detection system in order for method 300 to be capable of determining the projectile origin. To perform this determination, the known location (e.g. the image detection system's three-dimensional orientation) is used in order to re-reference it to the topographic map's coordinate system. The sensor plane's optical axis angular direction, tilt and rotation relative to earth's geographic latitude/longitude and true vertical are also known. Commercially available MEMS accelerometer, gyroscope and magnetometer ICs can be utilized for this purpose.

Figure 5:
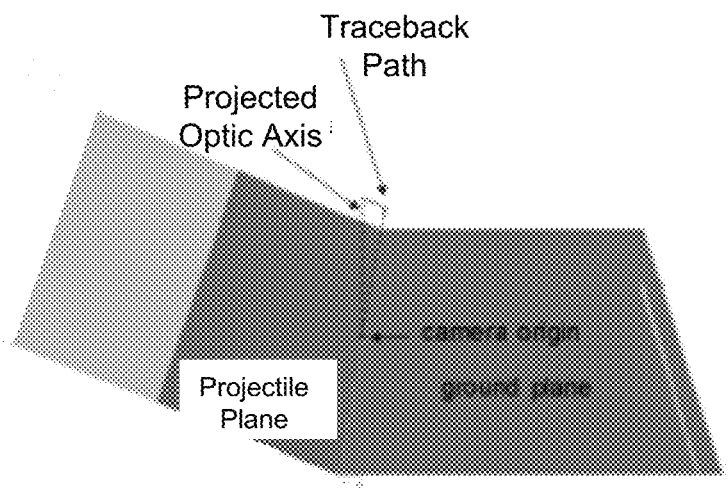
FIG. 5 is a diagram depicting an embodiment of tracing back a projectile to its origin.
Figure 6:
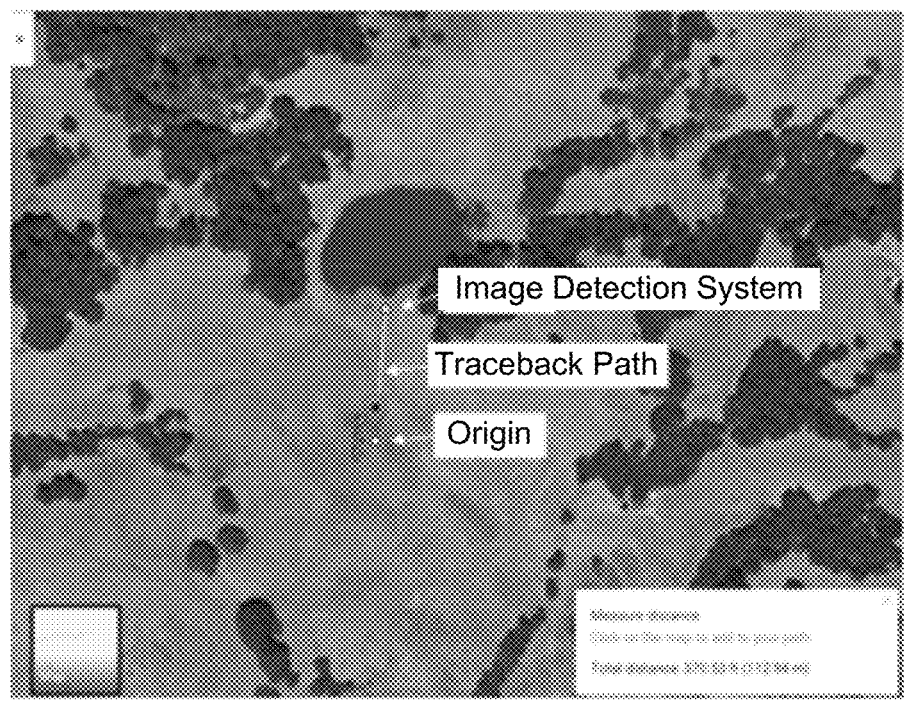
FIG. 6 is a diagram depicting a plan view of an embodiment of tracing back a projectile to its origin.

FIG. 5 is a diagram depicting an embodiment of idealized geometry 500 utilized in tracing back a projectile to its origin. Thus, the projectile plane determined at 310, the camera origin (the known location in this embodiment) and the ground plane are shown. Also shown is the traceback path at the intersection of the ground and projectile planes obtained using method 300. Similarly, FIG. 6 is a diagram depicting plan view 600 of an embodiment of tracing back a projectile to its origin using method 300. Thus, the image detection system and traceback path including the projectile origin are shown. The other features of the terrain, such as a body of water and other vegetation are indicated.

Using method 300, an image may be translated to a traceback path to a projectile origin, such as a shooter location. As discussed above, the actual location of the projectile origin may be near instead of on a particular traceback path, for example due to errors. Consequently, multiple traceback paths may be determined for the same projectile track in multiple images. These traceback paths can be averaged, clustered or otherwise analyzed statistically to improve the accuracy of the heading to the projectile origin. Further, detection of the projectile origin may include but not be limited to detection where the projectile origin is arbitrarily far away and/or the projectile origin is outside the image detection system's field of view (FOV). For example, although the projectile origin may be behind a hill, inside a structure, etc. and completely covert (e.g. no flash and no sound), the traceback path including the projectile origin may be located using method 300. The traceback path to the projectile origin may be achieved with a single camera, using a single projectile frame.

In some embodiments, method 300 may operate in real-time, i.e., within a frame time, following a projectile detection. Real-time operation of method 300 may allow for immediate countermeasures to be taken. In some embodiments, method 300 may be performed without a human-in-the-loop to assist with discrimination or verification. For example, if used with sensor technology described herein and given effective image processing techniques, the spatial-temporal signature of an imaged projectile need not be separately verified. Small pixel techniques oversample the blur in some embodiments, so that false alarms have a different pixel distribution than the smooth or Gaussian like shape of a real object focused onto the image plane with the lens transfer function imposed. Thus, false alarms may more easily be distinguished. Thus, detection of the projectile origin may be simplified, made more efficient and improved.

Figure 7:
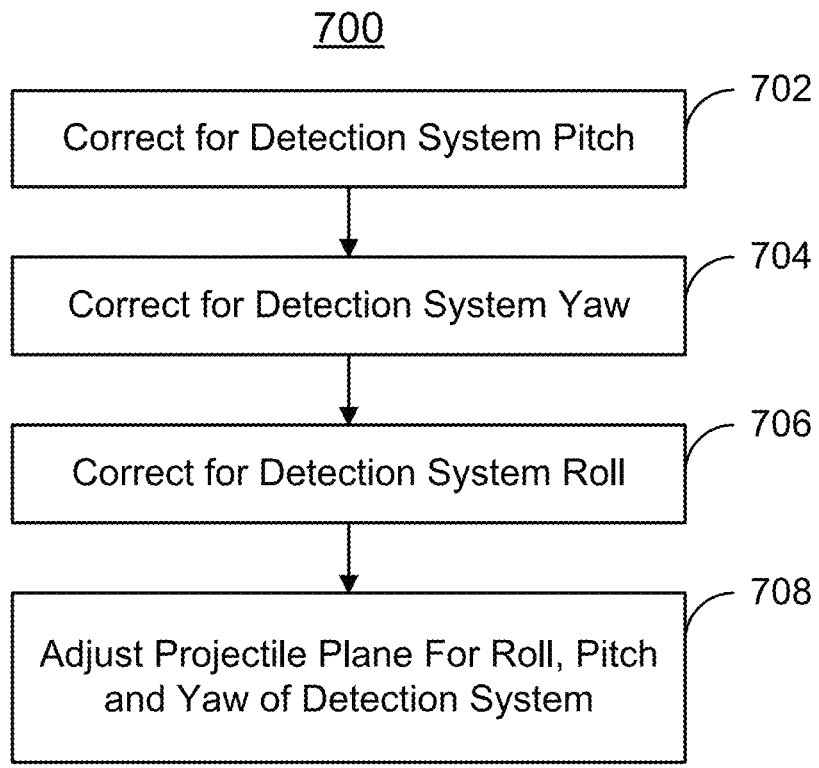
FIG. 7 is a flow chart depicting an embodiment of a method for determining the projectile plane.

FIG. 7 depicts an embodiment of method 700 used for determining the projectile plane. Method 700 may include substeps. In addition, in some embodiments, steps and/or substeps may be performed in another order, including in parallel. Method 700 may be viewed as performing 310 of method 300. Thus, method 700 commences after the intercepts have been determined for projectile tracks in an image.

The pitch of the detection system is accounted for in determining the projectile plane, at 702. This may be seen in FIGS. 4D-4E. If camera 420 were aimed parallel to the ground plane, a different projectile plane would be determined in method 300. The new projectile plane would intersect the ground plane along a different traceback path. The new traceback path would still include the projectile origin. Thus, the pitch of the detection system is determined and accounted for to determine the angle of the projectile plane with the ground plane. For example, if P is the pitch (angle of the z-axis with respect to the ground plane), then the angle from the ground plane to the y-intercept is $P+V*(y_i/y_t)$, where $y_i$ is the y-intercept, $y_t$ is the height of the image, and V is the vertical field of view of the image detection system e.g. in degrees.

The yaw of the image detection system is accounted for, at 704. In some embodiments, 704 may be omitted and the direction of the traceback path corrected for the image detection system's yaw. The yaw of the image detection system is the angle the projection of the optic axis on the ground plane makes with a known direction. For example, if the image detection is pointed east and at some pitch, the projection of the optic axis is ninety degrees from north. For example, FIG. 4E also depicts an embodiment of the direction of yaw (which is zero for the image capture system 420 shown). This direction may be accounted for in determining the real-world location and direction of the traceback path.

The roll of the image detection system is accounted for, at 706. The roll of the image detection system is the angle the image detection system is rotated from a reference angle, such as the angle rotated around optic axis from horizontal or the angle rotated from level around the projection of the optic axis on the ground plane. For example, FIG. 4E depicts an embodiment of the direction of roll (which is zero for the image capture system 420 shown). In some embodiments, the reference utilized for the roll is the earth horizon. The roll affects the slope of the bullet track with respect to the ground plane. For example, if the roll is zero, then the angle the bullet track makes with horizontal is $\arctan(y_i/x_i)$, where $y_i$ is the y-intercept and $x_i$ is the x-intercept. If the roll is defined as the angle the image detection system has been rotated counter clockwise by R with respect to the projection of the optic axis onto the ground plane, then the angle the line segment makes with the x-axis is $R-\arctan(y_i/x_i)$.

The pitch, yaw and roll of the image detection system are accounted for in the location of the projectile plane with respect to the ground plane, at 708. Thus, method 700 allows for the projectile plane to be located with respect to real world coordinates such as compass headings and a particular ground level (or ground plane). Consequently, method 700 allows for improved determination of traceback paths using method 300.

Figure 8:
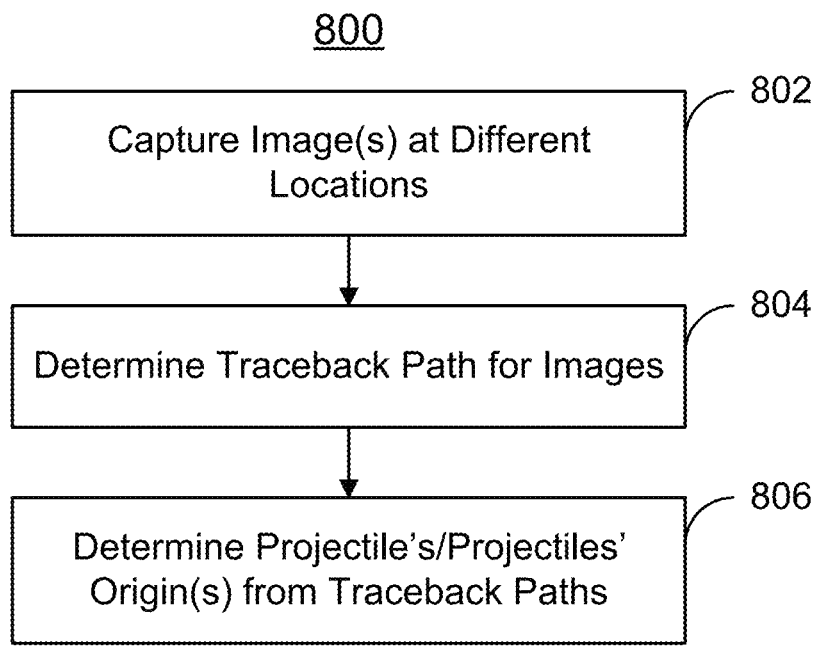
FIG. 8 is a flow chart depicting an embodiment of a method for tracing a projectile back to its origin using images.

FIG. 8 is a flow chart depicting an embodiment of method 800 for tracing a projectile back to its origin using images. Method 800 may include substeps. In addition, in some embodiments, steps and/or substeps may be performed in another order, including in parallel. Method 800 may be viewed as performing all or part of method 100, 300 and/or 700 for completion.

The images to be used in determining the traceback paths are captured at multiple locations, at 802. At 802, the image detection system(s) capture images in which the projectile tracks cross multiple pixels and in which the projectile tracks are resolvable. For example, images may be captured using one or more of the image detection systems described below. Other detection systems may be used in some embodiments. In some embodiments, the images are captured using an image detection system incorporated into a system for providing traceback paths. For example, a computer system which performs method 100, 300 and/or 800 may be coupled to the image detection system. However, in other embodiments, images used in determining the traceback paths may be provided in another manner and/or by another entity. Further, the images are captured at two or more known locations. In some embodiments, therefore, multiple image detection systems are utilized in performing 802. In some embodiments, a single, moving image detection system can be utilized to perform 802.

The traceback paths for the projectiles in the images are determined, at 804. Thus, method 100 and/or 300 may be performed at 804. In some embodiments, 804 includes for each projectile: detecting the projectile tracks corresponding to a projectile in multiple images, determining the image planes for the projectile tracks in multiple images, determining the line segments for the projectile tracks in the image planes, determining the intercepts for the line segments in the image planes, determining the projectile planes for the line segments in the image planes, and determining the traceback paths (e.g. the intersections of the projectile planes and ground plane(s)). In some embodiments, the topography may be overlaid on the traceback paths as part of 804. In other embodiments, the overlaying may be omitted or may be performed as part of 806, discussed below. 804 may be performed for at least two images captured from at least two locations for each projectile being traced. Use of more than two images per projectile may allow for statistical analysis of the traceback paths to improve the accuracy of and confidence in the location of the traceback path and projectile origin.

The projectile origin for each projectile is determined using the traceback paths for the projectile, at 806. In some embodiments, 806 includes determining the location of the intersection of the traceback paths for each projectile. Each traceback path includes the projectile origin. Because the images are captured at different locations and, in some cases, at different times, the projectile planes determined at 804/310 are different. Because the projectile planes differ, the intersections of the projectile planes with the ground plane differ. Thus, the traceback paths are different lines, but all include the projectile origin. As a result, the projectile origin occurs at the intersection of the traceback paths. Thus, the projectile origin may be determined from the traceback paths using method 800.

Figure 9:
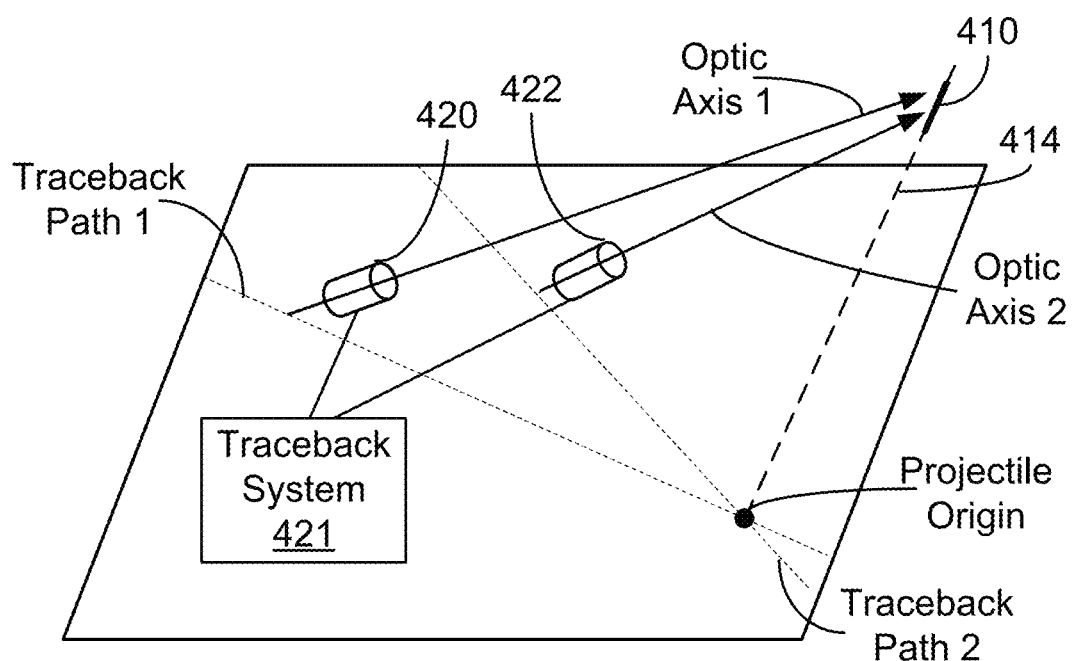
FIGS. 9-10 are diagrams depicting embodiments of tracing back a projectile to its origin.
Figure 10:
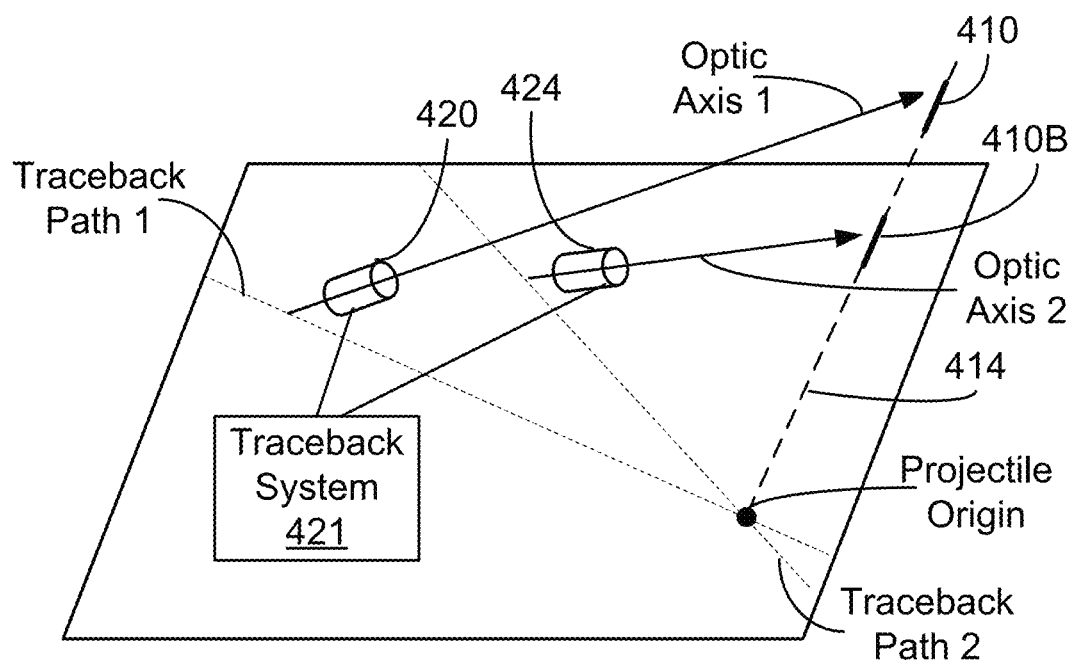

For example, FIGS. 9-10 are diagrams depicting embodiments of tracing back a projectile to its origin. Although depicted in the context of a single projectile, FIGS. 9-10 may be generalized to multiple projectiles originating from multiple locations. FIG. 9 includes two image detection systems 420 and 422. A single traceback system 421 is shown as coupled to both image detection systems 420 and 422. However, in some embodiments, multiple traceback systems may be used. Image detection systems 420 and 422 capture images including projectile track 410 that is part of the trajectory 414 (shown as a dashed line in FIG. 9) of projectile 412. Thus, both image detection systems 420 and 422 capture substantially the same portion of the projectile trajectory 414. Image detection systems 420 and 422 may be aimed at the same region in the real world. However, because their locations differ, optic axis 1 of image detection system 420 is different from optic axis 2 of image detection system 422. Traceback path 1 is determined using method 300/604 and is analogous to the traceback path found in FIG. 4E. Traceback path 2 is found using method 300/604. Traceback path 1 and traceback path 2 intersect at or near the projectile origin.

FIG. 10 depicts another system in which the projectile is traced back. FIG. 10 is shown as including image detection systems 420 and 424. In some embodiments, image detection systems 420 and 424 are separate image detection systems aimed at different locations in the real world. Although a single traceback system 421 is shown as coupled to both image detection systems 420 and 424, in such embodiments, multiple traceback systems may be used. In some embodiments, detection systems 420 and 424 might be the same detection system that has been moved to a new location. Thus, optic axis 1 is different from optic axis 2. Image detection system 420 capture image(s) including projectile track 410. Image detection system 424 captures image(s) including projectile track 410B, which corresponds to a different portion of trajectory 414. The images including projectile track 410 and 410B are captured at different times. Traceback path 1 is determined using method 300/804 and is analogous to the traceback path found in FIG. 4E. Traceback path 2 is found using method 300/804. Traceback path 1 and traceback path 2 intersect at or near the projectile origin. Thus, method 800 may use the same or different image detection systems and the image detection systems may capture the same or different portions of the projectile trajectory.

In some embodiments, method 800 may be viewed as using parallax to determine the projectile origin. A parallax method is akin to using stereo vision (e.g. two cameras operating with bore-sighted lenses and generating synchronous images). For example, a case study can be viewed as follows. An image detection system, such as image detection system 420 may utilize a 50 mm focal length lens. An object at 500 m (500 m from the image detection system) appears with $\frac{1}{10000}$ scale on the sensor. The lens FOV is 100 m at object using 2000 pixels at a 5 micrometer pitch. For example, a bullet (or other projectile) traveling 1000 m/s moves 0.1 m in one hundred microseconds. In some embodiments, twenty subframes, each of which is a 100 microsecond subframe, are used for an image. In such embodiments, the bullet travels a maximum of two meters in an image having a two millisecond (twenty subframe cycles) capture period if the bullet travels orthogonal to lens. Two meters at five hundred meters distance projects onto two hundred micrometers, or forty pixels having a five micrometer pitch. Similarly, if image detection system 420 moves laterally by two meters, a stationary object at five hundred meters appears to move by forty pixels on the sensor. Thus if two bore-sighted lenses are used to generate stereo images, the lenses of the image detection systems are greater than 2 meters/40=50 millimeters apart to three dimensionally locate object at 500 m.

For the purposes of this example, the projectile is regarded as a point source. This assumption is valid because a one centimeter long object at one hundred meters projects onto one sensor pixel at a five micrometer pitch with the fifty millimeters lens. However, if stereo measurement accuracy between the pair of images is ±0.5 pixel, this means distance uncertainty to an object at five hundred meters is 333-1000 meters or 33-100%. This level of uncertainty is generally unacceptable. To reduce this uncertainty, for example down to ±5%, the lens spacing is increased by a factor of approximately 10× to on the order of five hundred millimeters. This lens spacing makes an object at five hundred meters appear to move by ten pixels due to parallax. This corresponds to a ±5% uncertainty, which may be acceptable. Other uncertainties (e.g. lower uncertainties) may be obtained using other lens spacings (e.g. larger spacings between image detection systems 420 and 422 or between image detection systems 420 and 424). This five percent uncertainty translates to ground uncertainty depending on the angle of the projectile trajectory.

Using method 800, a single projectile track 410 can be used to geo-locate down to an ellipse of origination, using a three-dimensional topographic map and image detection system orientation, by finding the intersection of probable lines of trajectory with ground elevation profile. Calculations can be similar to a single camera/multiple projectile track method, but may use a more complex hardware configuration. Thus, the location of shooters/origin of flight of small projectiles (e.g. bullets) or large projectiles (e.g. missiles) may be determined using parallax.

Similarly, using a single image detection system in motion (e.g. as in FIG. 10), effective parallax may be achieved over two or more frames in a sequence, such as a video sequence. An image detection system would be in motion if, for example, it is mounted onto a vehicle on the ground or in the air, worn on the body, or worn as headgear. Applying method 800 to each detected projectile track then generates a heading to the shooter location. Multiple projectile track detections from the same shooter or multiple frames including the same projectile track may result in a cluster of traceback paths, each emanating from the image detection system's location in space and time. These traceback paths geometrically intersect at a location on a topographic map. This is because the motion of the image detection system including roll/pitch/yaw and its geo-location may be accounted for in real time by method 800. Thus, projectile origins, such as shooters' locations, may be more readily determined.

Conversely, multiple image detection systems mounted onto multiple stationary or moving platforms such as a collection of dismounted soldiers, vehicles or airborne drones increase probability of each projectile located being due to numerous and simultaneous perspectives of surrounding terrain. Multiple image detection systems also offer very fast two-dimensional location on a topographic map should just two or more image detection systems successfully detect a projectile track. A method of simple short-range communication among the image detection systems may allow each camera system to include information from all other projectile track detections for rapid overlay onto a display and provide a collectively improved accuracy in determining the projectiles' origin(s). Even if just one image detection system detects a projectile track, this traceback path information becomes quickly available to every other system and assists in directing counter-measures rapidly toward the direction of the shooter. Thus, the location of shooters/origin of flight of small projectiles (e.g. bullets) or large projectiles (e.g. missiles) may be determined via temporal/distributed parallax.

Using method 800, images may be translated to traceback paths, which may be used to determine origins of projectiles. As discussed above, the actual location of the projectile origin may be near instead of on a particular traceback path, for example due to errors. Consequently, multiple traceback paths may be determined for the same projectile track in multiple images. These traceback paths can be averaged, clustered or otherwise analyzed statistically to improve the accuracy of the projectile origin. The projectile origin may be detected where the projectile origin is arbitrarily far away and/or the projectile origin is outside the image detection system's FOV. In some embodiments, method 800 may operate in real-time, i.e., within a frame time, following a projectile detection. Real-time operation of method 800 may allow for immediate countermeasures to be taken. In some embodiments, method 800 may be performed without a human-in-the-loop to assist with discrimination or verification. For example, if used with sensor technology described herein and given effective image processing techniques, the spatial-temporal signature of an imaged projectile need not be separately verified. Small pixel techniques oversample the blur in some embodiments, so that false alarms have a different pixel distribution than the smooth or Gaussian like shape of a real object focused onto the image plane with the lens transfer function imposed. Thus, false alarms may more easily be distinguished. Thus, detection of the projectile origin may be simplified, made more efficient and improved.

Figure 11A:
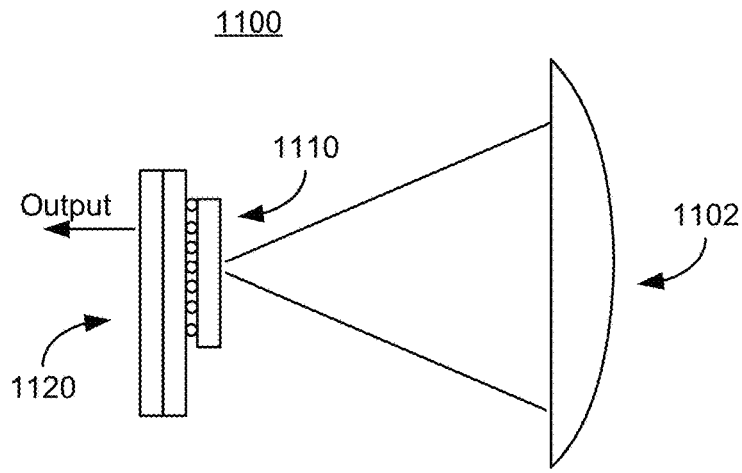
FIGS. 11A-11B depict an embodiment of an infrared detection system.
Figure 11B:
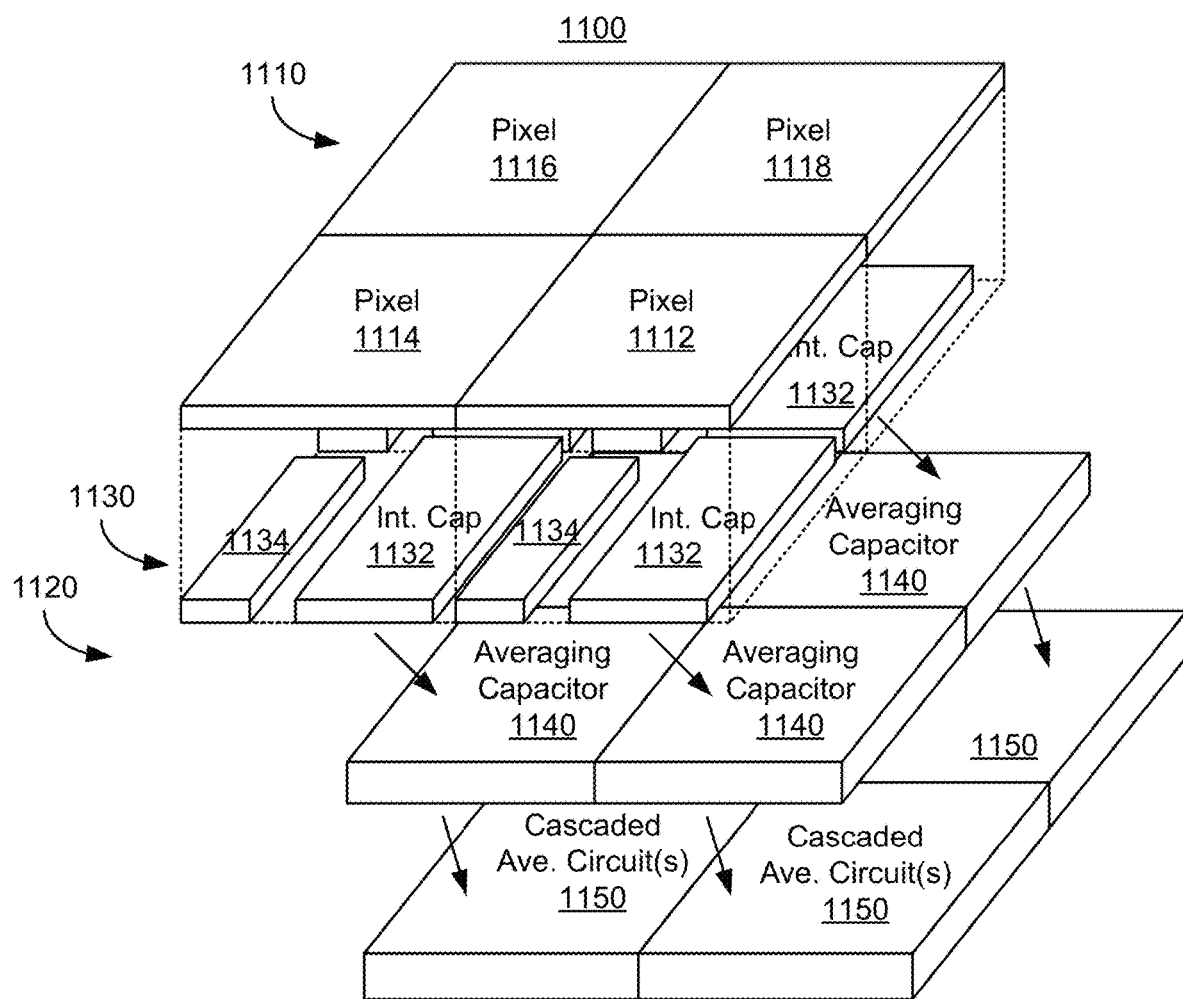

FIGS. 11A-11B are block diagrams depicting an embodiment of detection system 1100. FIG. 11A is a side view of detection system 1100. FIG. 11B is an exploded view of a portion of detection system 1100. FIGS. 11A-11B are not to scale and only some components are shown. For example, FIG. 11B is intended to indicate relative areas and thus does not include various elements of detection system 1100. In some embodiments, detection system 1100 is an infrared radiation (IR) detection system. Thus, system 1100 is described in the context of infrared detection. However, in some embodiments, detection system 1100 might be used in connection with other wavelengths of light. IR detection system 1100 includes lens 1102, detector array 11110 that includes an array of pixels, and read out integrated circuit (ROIC) 1120. Lens 1102 focuses light down to a tightly focused spot. In some embodiments, lens 1102 focuses light to cover only a few pixels at a time. For example, the spot may impinge on 1, 2, 3, 4, 5 or 6 pixels of detector array 1110 at a particular time. In some embodiments, lens 1102 is configured to have an f-number equal or less than that required for Nyquist sampling with 5 micron pixels (e.g. typically less than 2). For example, lens 1102 may have an f-number greater than 0.8 and less than 1.5 for a midwave infrared band detector. In some embodiments, lens 1102 has an f-number that is nominally one. In other embodiments, lens 1102 may have a different f-number, including but not limited to 1.8-2.3 (e.g. nominally 2.0).

Detector 1110 is shown as a monolithic hybrid bumped interconnected detector. For example, detector 1110 may be a low band gap IR detector. In some embodiments, detector 1110 may be another type of detector. Detector 1110 includes an array of pixels, of which only four pixels 1112, 1114, 1116 and 1118 are shown in FIG. 11B. In some embodiments, pixels 1112, 1114, 1116 and 1118 are aligned with solder bumps (not shown in FIG. 11B) which provide connection to the underlying ROIC 1120. Pixels 1112, 1114, 1116 and 1118 may be considered to function as photodiodes. In some embodiments, pixels 1112, 1114, 1116 and 1118 have the same size. In some embodiments, pixels 1112, 1114, 1116 and 1118 are substantially square. In other embodiments, pixels 1112, 1114, 1116 and 1118 may have different sizes and/or other shapes. Pixels 1112, 1114, 1116 and 1118 are desired to be small. For example, detector 1110 may have a pixel pitch of less than ten micrometers (e.g. pixels 1112, 1114, 1116 and 1118 being smaller than 10 μm×10 μm). In some embodiments, pixels 1112, 1114, 1116 and 1118 may have a pitch of not more than eight micrometers ((e.g. pixels 1112, 1114, 1116 and 1118 being smaller than 8 μm×8 μm). In some embodiments, detector 1110 may have a pixel pitch of not more than six micrometers. For example, pixels 1112, 1114, 1116 and 1118 may have a pitch of five micrometers or less (e.g. pixels 1112, 1114, 1116 and 1118 being 5 μm×5 μm or smaller). In some embodiments, detector 1110 may have a pixel pitch of not more than three micrometers. Thus, pixels 1112, 1114, 1116 and 1118 are small in size. The number of pixels in the array of detector 1110 may be large. For example, a 1080×1920 array of pixels may be used in detector 1110. Other numbers, aspect ratios, numbers or pixels and/or other geometries are possible. The pixels in the array of detector 1110 may be read out and processed in a raster scan.

ROIC circuit 1120 includes fast integration and readout circuits 1130 utilized in providing a faster readout and may include cascaded averaging circuits 1150. Each fast readout circuit 1130 includes integration capacitor 1132, additional component(s) 1134, averaging capacitor 1140 and may include other elements. For example, switches and other elements are not shown. For example, a switch coupled between capacitors 1132 and 1140 may be used in periodically providing the signal on integration capacitor 1132 to averaging capacitor 1140. Additional component(s) 1134 may include a transistor coupled adjacent to the corresponding pixel 1112, 1114, 1116 or 1118 and integration capacitor 1132.

Integration capacitor 1132 and additional component(s) 1134 are laid out in a manner that may be constrained by the area of pixels 1112, 1114, 1116 and 1118. For example, integration capacitor 1132 and additional component(s) 1134 may be aligned with (e.g. under in an integrated circuit) the corresponding pixel 1112, 1114, 1116 and/or 1118. In some embodiments, components 1132 and 1134 may be in or near the corresponding pixels 1112, 1114, 1116 or 1118. Thus, components 1132 and 1134 may not consume more area than the corresponding pixel 1112, 1114, 1116 and/or 1118. Averaging capacitor 1140 of readout circuit 1130 and cascaded averaging circuits 1150 may be laid out in another manner such that the sizes of averaging capacitor 1140 and cascaded averaging circuits 1150 are not constrained by the areas of pixels 1112, 1114, 1116 and 1118 in the same way as for elements 1132 and 1134. For example, averaging capacitor 1140 and/or cascaded averaging circuits 1150 may be under the first layer of circuitry of ROIC 1120 (e.g. under integration capacitor 1132 and other components 1134) or adjacent to regions containing integration capacitor 1132 and other components 1134.

As indicated in FIG. 11B, integration capacitor 1132 has an area less than the available area corresponding to pixel 1112, 1114, 1116 and/or 1118. Additional components 1134 (if any) may occupy a particular portion of the area corresponding to pixels 1112, 1114, 1116 and/or 1118. The remaining area corresponding to pixels 1112, 1114, 1116 and/or 1118 is the available area. For example, suppose pixels 1112, 1114, 1116 and 1118 have a five micrometer pitch (e.g. are 5 μm×5 μm). If no other components are present, the available area is twenty-five square micrometers. In such a case, integration capacitor 1132 occupies an area that is less than twenty-five square micrometers. In some embodiments, additional components 1134 may include a transistor and/or additional components. Such a transistor might utilize ten square micrometers. For the five micrometer pitch example above, the available area is fifteen square micrometers (twenty-five square micrometers per pixel minus ten micrometers for the transistor). Integration capacitor 1132 thus occupies less than fifteen square micrometers in such cases. In some embodiments, integration capacitor 1132 occupies less than one-half of the available area. In some such embodiments, integration capacitor 1132 occupies not more than one-third of the available area. For example, integration capacitor 1132 might consume not more than one-fourth of the available area. As a result, integration capacitor 1132 has a capacitance, or well capacity, that is less than is allowed by the available area. In the five micrometer pitch/transistor 1134 example above, the available area for integration capacitor 1132 is fifteen square micrometers. This available area corresponds to a capacitance of approximately forty-five femto-Farads. Thus, integration capacitor 1132 has a capacitance of less than forty-five femto-Farads in this case. In some embodiments, integration capacitor 1132 has a capacitance of not more than half of the maximum capacitance for the available area (e.g. not more than twenty femto-Farads for a five micrometer pitch). In some such embodiments, integration capacitor 1132 has a capacitance of not more than one-third of the maximum capacitance for the available area (e.g. not more than fifteen femto-Farads for a five micrometer pitch). In some such embodiments, integration capacitor 1132 has a capacitance of not more than one quarter of the maximum capacitance for the available area (e.g. not more than twelve femto-Farads for a five micrometer pitch). In some embodiments, the capacitance of integration capacitor 1132 is less than ten femto-Farads and at least one femto-Farad. For example, integration capacitor 1132 might have a capacitance of 6-7 femto-Farads. Other capacitances are possible in other embodiments, for example based upon the dielectric constant of the insulator used in the capacitor and the area of the capacitor. Integration capacitor 1132 may have an integration time of not more than 1000 microseconds. In some embodiments, the integration time is not more than 500 microseconds. The integration time may be not more than 200 microseconds. For example, the integration time is as low as 100 microseconds or less. Other integration times are possible. Thus, integration capacitor 1132 may consume a smaller area, have a lower capacitance, a shorter integration time and a significantly higher gain.

In some embodiments, ROIC 1120 may be a three-dimensional ROIC. In such embodiments, ROIC 1120 may have multiple layers. In such embodiments, elements of ROIC 1120 may be vertically stacked and interconnected with vias (not shown). In such embodiments, integration capacitor 1132 may have a larger area based on the number of layers of the three-dimensional ROIC. However, the area per layer of such an integration capacitor may still be limited by the size of the corresponding pixel in an analogous manner. Thus, the capacitance of integration capacitor 1132 may be limited by the area of the corresponding pixel 1112, 1114, 1116 and/or 1118. For a single layer ROIC, this limitation may correspond directly to the area of the pixel. For a three-dimensional ROIC, the pixel area still corresponds to a maximum capacitance of integration capacitor 1132. However, maximum capacitance in such a case may be different (e.g. larger than for a single layer ROIC). Thus, integration capacitor 1132 may have an integration capacitance less than the maximum capacitance.

Averaging capacitor 1140 is coupled with integration capacitor 1132, for example through a switch (not shown). Averaging capacitor 1140 periodically receives input from integration capacitor 1132. For example, a signal may be provided from integration capacitor 1132 to averaging capacitor 1140 in response to the expiration of a time interval equal to the integration time. This may be accomplished by the periodic closing of the switch. Averaging capacitor 1140 has a greater capacitance, and thus well size, than integration capacitor 1132. In some embodiments, averaging capacitor 1140 has a capacitance that is at least twice and not more than twenty multiplied by the capacitance of integration capacitor 1132. Other capacitances are possible. Consequently, the charge on integration capacitor 1132 can be periodically provided to averaging capacitor 1140 in time intervals substantially equal to the integration time. For lower integration times, more samplings of integration capacitor 1132 may be provided to averaging capacitor 1140 to improve signal-to-noise ratios.

Averaging capacitor 1140 can provide an averaged signal after multiple samplings of integration capacitor 1132. Thus, averaging capacitor 1140 may be used to reduce noise in a signal provided from integration capacitor 1132. Averaging capacitor 1140 may still be sampled frequently to provide a fast readout. For example, a frame rate generally refers to sensor frame rate. Faster frame rates, which may meet or exceed 500 frames per second. In some embodiments, fast frame rates are at least 1000 frames per second. Such fast frame rate may be used for high maneuvering threats, jitter and smear reduction on moving platforms, and reduction of atmospheric effects. In some embodiments, framing that is above 1000 frames per second may be called "fast framing". In other embodiments, framing that is above 500 frames per second might be termed fast framing. The fast readout from averaging capacitor 1140 is consistent with fast framing in some embodiments. In some embodiments, integration capacitor 1132 can be joined though a switch (not-shown) to capacitor 1140 and only integrated for one integration cycle on the co-joined capacitors. This co-joined capacitor mode also enables very fast framing. In some embodiments greater than 1000 frames per second may be achieved.

IR detection system 1100 may also include one or more cascaded averaging circuits 1150 coupled to a corresponding fast readout circuit 1130. Cascaded averaging circuit(s) 1150 provide additional averaging to the signal from detector 1110. More specifically, cascaded averaging circuit(s) 1150 are coupled to a corresponding averaging capacitor 1140. In some embodiments, each cascaded averaging circuit 1150 includes at least one pair of capacitors arranged in a manner analogous to integration capacitor 1132 and averaging capacitor 1140. Thus, each cascaded averaging circuit 1150 may include an additional integration capacitor (not explicitly shown in FIGS. 11A-11B), an additional averaging capacitor (not explicitly shown in FIGS. 11A-11B) coupled with the additional integration capacitor and a switch coupled between the additional integration capacitor and the additional averaging capacitor. The additional averaging capacitor in the cascaded averaging circuit has an additional averaging capacitance greater than the additional integration capacitance of the additional integration capacitor in the cascaded averaging circuit. In some aspects, cascaded averaging circuit(s) 1150 are coupled to the averaging capacitor through a transistor and/or an amplifier. In other embodiments, an amplifier between cascaded averaging circuit and the averaging capacitor may be omitted. Operation of IR detection system 1100 is analogous to operation of IR detection system 1200, described below.

IR detection system 1100 may have improved performance. Detector 1110 may include smaller pixels (e.g. less than ten micrometers and five micrometers or less in some embodiments). Consequently, benefits such as improved resolution and reduced noise equivalent power (NEP) may be achieved. Further, IR detection system 1100 may address issues resulting from use of smaller pixels 1112, 1114, 1116 and 1118. A low f-number lens 1102 may be used. Using a low f-number (e.g. less than 2 and nominally 1 in some embodiments) for lens 1102 in conjunction with a high gain integration capacitor 1132, averaging capacitor 1140 and cascaded averaging circuit(s) 1150, the low etendue, or light collection efficiency, of small pixels 1112, 1114, 1116 and 1118 can be mitigated. ROIC 1120 may have circuit components allowing for increased gain for small pixels 1112, 1114, 1116 and 1118 while using successive signal averaging stages, such as averaging capacitor 1140 and cascaded averaging circuits 1150. Use of successive/cascaded averaging stages can reduce noise and hence improve noise equivalent power, signal to noise, and detectivity.

The high gain and low integration time (and smaller capacitance) of integration capacitor 1132 may also aid performing fast framing. In some embodiments, frame rates up to and exceeding 1000 frames per second may be supported. Similarly, low integration times, such as two hundred microseconds or less, may be utilized. Thus, multiple closely spaced fast moving events may be imaged on nanosecond or microsecond time scales at long ranges. The data from integration capacitor 1132 can be averaged using averaging capacitor 1140 so that a dim signal can be detected. Cascaded averaging circuit(s) 1150 effectively provides longer integration times and improves dynamic range, signal to noise, and contrast to noise ratio. Each stage of the cascaded averaging circuit 1150 reduces noise further and allows a longer time of integration for small pixels so that the signal to noise of smaller pixel may be equal or better than that of larger pixels. The high gain/low integration time of capacitors 1132 and 1140 in combination with the high effective well capacity of cascaded averaging circuit(s) 1150 allows for fast framing, low noise and high well capacity with a design and layout conducive to a small pixel format. Thus, IR detection system 1100 may reduce integration times, improve signal-to-noise, increase sensitivity, improve contrast, increase dynamic range, provide higher frame rates and improve imaging using smaller pixels 1112, 1114, 1116 and 1118. As a result, target detection, bullet trace back, detection of ultrasonic and hypersonic targets, detection of dim targets, improved resolution of distant targets and other applications may be facilitated.

Figure 12A:
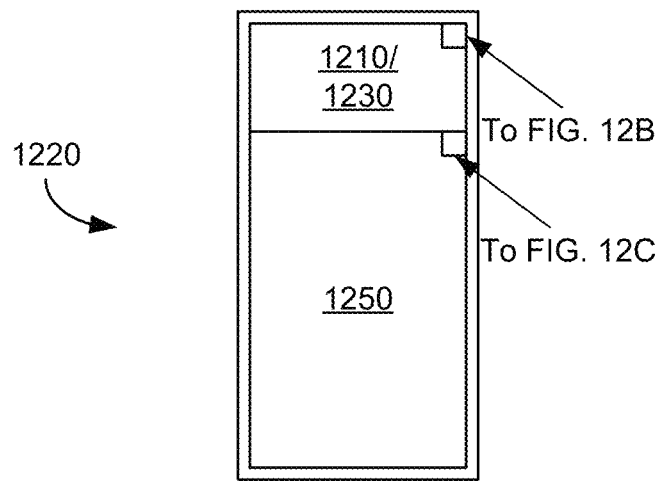
FIGS. 12A-12D depict another embodiment of an infrared detection system.
Figure 12B:
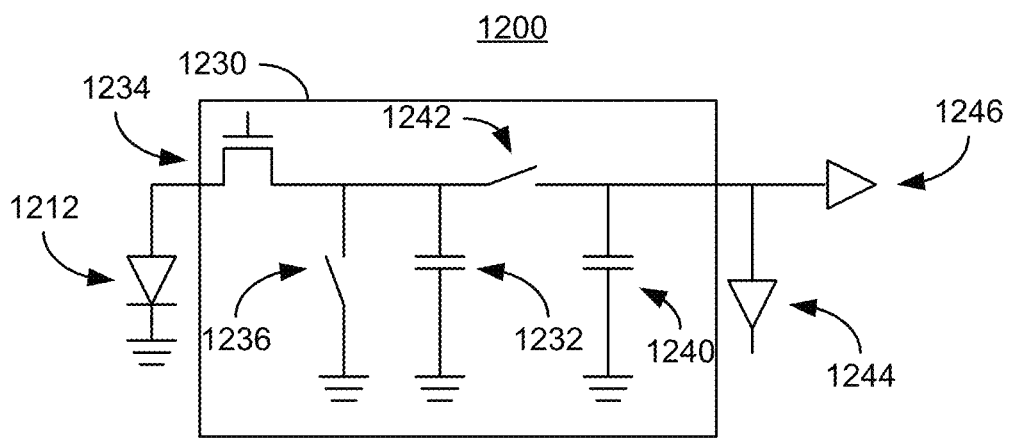
Figure 12C:
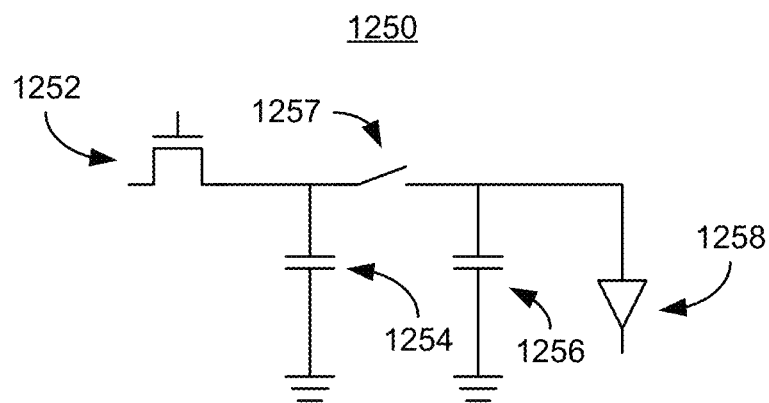
Figure 12D:
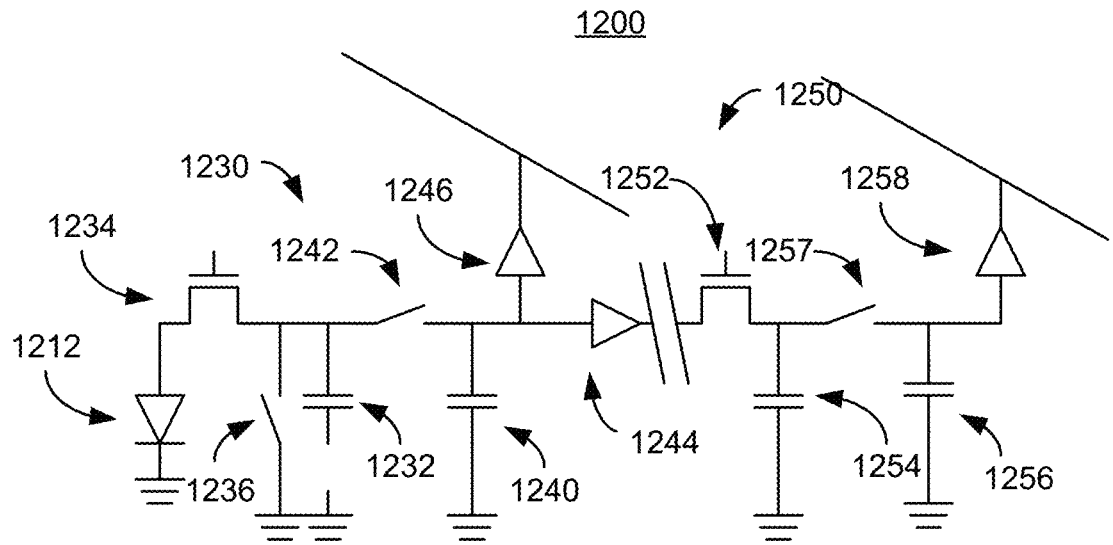
Figure 13:
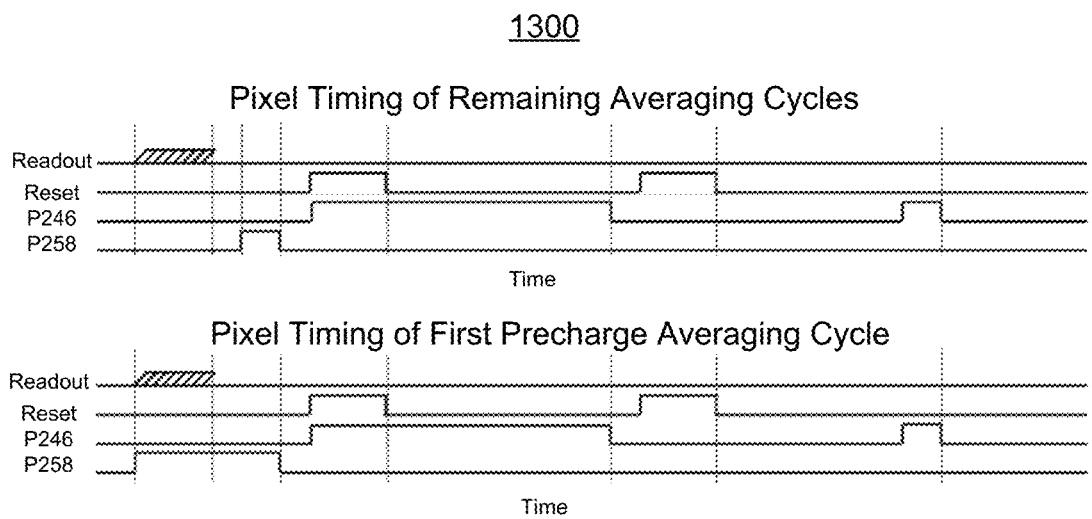
FIG. 13 depicts an embodiment of timing usable for an infrared detection system including a cascaded averaging circuit.

FIGS. 12A-12D depict another embodiment of detection system 1200. For clarity, only some components are shown. In some embodiments, detection system 1200 is an IR detection system. System 1200 is, therefore, described in the context of infrared detection. IR detection system 1200 includes detector 1210 and ROIC 1220. Detector 1210 includes an array of pixels and is analogous to detector 1110. ROIC 1220 that is analogous to ROIC 1120. A lens is not shown. However, a lens analogous to lens 1102 may be used in connection with IR detection system 1200. ROIC 1220 includes fast readout circuitry 1230 and cascaded averaging circuit(s) 1250 that are analogous to readout circuitry 1130 and cascaded averaging circuit(s) 1150, respectively. FIG. 12A depicts an embodiment of the breakout of components 1210, 1220, 1230 and 1250 and is not to scale. FIGS. 12B-12C depict circuit diagrams corresponding to portion of ROIC 1220. FIG. 12D depicts an embodiment of connections for components 1210, 1220, 1230 and 1250. As indicated by FIG. 12A, readout circuitry 1230 may be aligned with (e.g. fabricated under) detector 1210. Detector 1210 includes an array of pixels analogous to detector 1110. Thus, the sizes of the pixels in detector 1210 and areas of components in readout circuit 1230 are analogous to those described above with respect to detector 1110 and readout circuit 1110. In the embodiment shown, cascaded averaging circuit(s) 1250 reside to the side of the detector 1210 and readout circuits 1230. In other embodiments the cascaded averaging circuit(s) 1250 may reside underneath another layer, such as the layer including readout circuits 1230. Switch 1236 can be used as a reset to capacitor 1232 and/or capacitor 1240.

FIGS. 12B-12C are circuit diagrams depicting portions of IR detection system 1200. FIG. 12B depicts pixel 1212 of detector 1210, readout circuit 1230 and amplifiers 1244 and 1246. Pixel 1212 is a photodiode and analogous to one of pixels 1112, 1114, 1115 and 1118. Thus, pixel 1212 may be small, for example less than ten micrometers on a side. In some embodiments, pixel 1212 may be not more than five micrometers on a side. Readout circuit 1230 includes integration capacitor 1232 and transistor 1234 that are analogous to integration capacitor 1132 and component(s) 1134. Thus, integration capacitor 1232 may occupy less than the available area corresponding to detector 1212 and transistor 1234. Integration capacitor 1232 may also have a smaller capacitance. In some embodiments, integration capacitor 1232 has a capacitance that is not more than twenty femto-Farads. Integration capacitor 1232 may have a capacitance that is less than fifteen femto-Farads. In some embodiments, integration capacitor 1232 has a capacitance of at least one femto-Farad and not more than ten femto-Farads. In some embodiments, integration capacitor 1232 may have another capacitance. Although not shown in FIG. 12B, transistor 1234 may be biased during operation of IR detection system 1200. For example, slightly reverse biasing pixel/detector 1212 may provide a field such that when the photon hits the detector, the electron-hole pair is provided.

Readout circuit 1230 also includes averaging capacitor 1240 and switches 1236 and 1242. Averaging capacitor 1240 has a capacitance that is generally greater than the capacitance of integration capacitor 1232. For example, averaging capacitor 1240 may have a capacitance that is at least twice and not more than eighty multiplied by the capacitance of integration capacitor 1232. In some such embodiments, averaging capacitor 1240 has a capacitance that it not more than twenty multiplied by the capacitance of integrating capacitor 1232. In some embodiments, one of the amplifiers, such as amplifier 1246, may be used to provide an output from averaging capacitor 1240. The other amplifier, such as amplifier 1244, may provide a connection to cascaded averaging circuit(s) 1250.

An embodiment of cascaded averaging circuit(s) 1250 are depicted in FIG. 12C. In the embodiment shown in FIG. 12C, a single stage, or a single cascaded averaging circuit 1250 is used. In other embodiments, multiple cascaded averaging circuits (e.g. multiple stages) may be utilized. Cascaded averaging circuit 1250 is analogous to cascaded averaging circuit 1150. Cascaded averaging circuit 1250 is coupled with averaging capacitor 1240 via transistor 1252 and amplifier, such as amplifier 1244. In some embodiments, cascaded averaging circuit(s) 1250 is located to the side of the pixel array of detector 1210 and connected via a multiplexer (not shown). In some embodiments, cascaded averaging circuit 1250 is connected in a three-dimensional stack below the circuitry depicted in FIG. 12B. Other configurations are possible. In some embodiments, the high capacitor density and small design rules may allow for more components in small pixel imager array. Cascaded averaging circuit 1250 may be located nearby to pixel 1212 and associated circuitry depicted in FIG. 12B. Cascaded averaging circuit 1250 includes an additional integration capacitor 1254, additional averaging capacitor 1256, transistor 1252, switch 1257 and amplifier 1258. Signals input to cascaded averaging circuit 1250 via transistor 1252 are integrated onto integration capacitor 1254. After the expiration of a particular time interval, which may be larger than the integration time, switch 1257 is closed and the charge on additional integration capacitor 1254 is provided to additional averaging capacitor 1256. This process may be repeated multiple times. Consequently, additional averaging capacitor 1256 provides averaging of the signals integrated on additional subframe integration capacitor 1254. The averaged signal may be output via amplifier 1258.

FIG. 12D depicts an embodiment of a IR detection system 1200 including pixel 1212, readout circuit 1230, cascaded averaging circuit 1250 and associated components. FIG. 12D thus includes a particular arrangement of pixel 1212/detector, readout circuit 1230, averaging circuit 1250, amplifiers 1244, 1246 and 1248 and switches 1242 and 1257 of FIGS. 12A-12C. In the embodiment shown, readout circuit 1230 includes two capacitors 1232 and 1240 and cascaded averaging circuit 1250 includes two capacitors 1254 and 1256. Integrating capacitor 1232, averaging capacitor 1240 and switch 1242 form a high gain input circuit in which current from the photodiode/pixel 1212 flows through the bias controlling direct injection gate 1234. Integrating capacitor 1232 forms a high transimpedance gain circuit whereby the signal and other front end noise sources can undergo a significant gain to allow fast well filling and fast frame rates. However, the noise on the integrating capacitor 1232 also undergoes gain. Averaging capacitor 1240 provides some noise reduction. Cascaded averaging circuit 1250 allows the high transimpedance with short integration times, but also provides for successively averaging the signal and noise from pixel 1212 and the remainder of IR detection system 1200. Thus, the lower photon flux signal for smaller pixel 1212 is not dominated by the noise after cascaded signal averaging.

Readout circuit 1230 provides integration of the signal from pixel 1212. Readout circuit 1230 also allows imaging of targets moving more quickly due to the short integration time for integration capacitor 1232. More specifically, signals from pixel 1212 are integrated on integration capacitor 1232 during an integration time. The integration time may be in the ranges described above. For example, the integration time may be two hundred microseconds or less in some embodiments. In addition to allowing for a short integration time for integration capacitor 1232, capacitor 1240 allows for averaging of the signal provided from pixel 1212. More specifically, after the expiration of the integration time, the charge on integration capacitor 1232 is provided to averaging capacitor 1240. This may be achieved by closing switch 1242. This procedure may be carried out for multiple cycles, with each cycle corresponding to an integration time. Thus, averaging capacitor 1240 may provide averaging of the signal from integration capacitor 1232. In some embodiments, readout circuit 1230 may reduce the noise on the signal from integration capacitor 1232 by a factor of approximately two through five. Thus, a fast readout, for example that may be suitable for fast framing described above, may be provided while allowing for some noise reduction by averaging capacitor 1240. A readout may be performed via amplifier 1246, while amplifier 1244 provides signals to cascaded averaging circuit 1250.

Cascaded averaging circuit 1250 provides additional averaging. Thus, averaging is cascaded through two sets of capacitors (1232/1240 and 1254/1256) if cascaded averaging circuit 1250 is used. Cascaded averaging circuit 1250 includes additional integration capacitor 1254, additional averaging capacitor 1256 and switch 1257. The capacitance of averaging capacitor 1256 is greater than the capacitance of integration capacitor 1254. In some embodiments, the capacitance of averaging capacitor 1256 is at least two and not more than twenty multiplied by the capacitance of integration capacitor 1254.

Cascaded averaging circuit 1250 reduces the noise over the signal provided by averaging capacitor 1240. Cascaded averaging circuit 1250 functions in a manner analogous to readout circuit 1230. More specifically, after the expiration of a particular time or a particular number of integrations of integration capacitor 1232, the charge on averaging capacitor 1240 is provided to additional integration capacitor 1254. This process is repeated a number of times. The charge on additional integration capacitor 1254 is shared via the switch 1257 with additional averaging capacitor 1256. This may be achieved by closing switch 1257. This procedure may be carried out for multiple cycles. Thus, additional averaging capacitor 1256 may provide averaging of the signal from additional integration capacitor 1254. For example, cascaded averaging circuit 1250 may reduce the noise on the averaging capacitor 1240 by about a factor of at least two and not more than five in some embodiments. In some embodiments, the sum of the capacitances of integration capacitor 1232 and averaging capacitor 1240 is greater than two femto-Farads. In some embodiments, the sum of the capacitances of integration capacitor 1232 and averaging capacitor 1240 is greater than ten femto-Farads. Similarly, in some embodiments, the sum of the capacitances of additional integration capacitor 1254 and additional averaging capacitor 1256 is greater than two femto-Farads. In some embodiments, the sum of the capacitances of additional integration capacitor 1254 and additional averaging capacitor 1256 is greater than ten femto-Farads. For example, capacitor 1254 may be at least one femto-Farad and not more than ten femto-Farads in some embodiments. In some embodiments, capacitor 1256 may have a capacitance of at least two femto-Farads and not more than fifty femto-Farads. In some embodiments, amplifier 1244 and capacitor 1254 may be omitted, for example if there is low enough interconnection capacitance from capacitor 1240 to capacitor 1256.

Capacitors 1232 and 1240 and transistor 1234 of readout circuit 1230 function in an analogous manner to capacitors 1254 and 1256 and transistor 1252 of cascaded averaging circuit 1250. Readout circuit 1230 and cascaded averaging circuit 1250 may also function together. Suppose averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. In operation, integration capacitor 1232 is charged while switches 1236 and 242 are open. Periodically, upon the expiration of time intervals equal to the integration time, switch 1242 is closed and the charge from integration capacitor 1232 is provided to averaging capacitor 1240. This occurs $K_1$ times. This more rapidly changing, averaged (fast frame) signal may be read onto the line coupled with amplifier 1246. The signal from averaging capacitor 1240 is also provided via amplifier 1244 and transistor 1252 to additional integration capacitor 1254. Additional integration capacitor 1254 thus receives a signal that has been averaged a $K_1$ times through averaging capacitor 1240. Switch 1257 is periodically closed to allow charge from additional integration capacitor 1254 to be provided to additional averaging capacitor 1256. This occurs $K_2$ times. The signal from additional averaging capacitor 1256 may be read out on the line coupled with amplifier 1258. These operations repeat cyclically. Thus, a faster averaged signal may be output from averaging capacitor 1240, while a lower noise, further averaged signal may be output from additional averaging capacitor 1256. As a result, IR detection system 1200 may have similar benefits as IR detection system 1100. Thus, target detection, bullet trace back, detection of ultrasonic and hypersonic targets, detection of dim targets, improved resolution of distant targets and other applications may be facilitated.

In some embodiments, precharging may be utilized. FIG. 3 depicts an embodiment of timing 1300 usable for an IR detection system including a cascaded averaging circuit, such as integration detection system 1200. Thus, timing 1300 is described in the context of infrared detection system 1200. In other embodiments, other timing may be used. Operation of infrared detection system 1200 with precharging may be explained utilizing timing 1300 as follows. As in the example above, averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. Also, in some embodiments, the clock used in timing the IR detection system may be selected to be a multiple of the sampling rate. Selecting a clock cycle that is greater than the sampling rate (e.g. the multiple of the sampling rate) may mitigate noise.

A timing cycle beings during readout of the previously completed frame's signals through amplifier 1246 (e.g. for a fast frame reading) and/or through amplifier 1258 (for a lower noise readout) onto corresponding columns lines. During this read period, additional averaging capacitor 1256 may be precharged. In addition, the averaged, integrated signal may be sampled from averaging capacitor 1240 onto additional integration capacitor 1254 through amplifier 1244. This readout is accomplished by holding switch 1257 closed during readout row selection. For the next $K_2-1$ frames out of $K_2$ frames of total cascaded averaging cycles, switch 1257 is closed only after each readout of averaging capacitor 1240 is completed. At this time additional averaging capacitor 1256 has a lower noise copy of the charge accrued by averaging capacitor 1240. Momentarily closing switch 1257 thus performs the cascaded averaging operation from capacitor 1254 onto capacitor 1256.

Between each readout period for cascaded averaging circuit 1250, readout circuit 1230 is performing a similar precharge and averaging function for $K_1$ cycles. Photodiode/pixel 1212 produces a photo signal that is integrated onto integration capacitor 1232 in response to conditions set by bias transistor 1234 and the photo signal. The period of integration is defined as the time between switch 1236 opening and switch 1242 opening in sequence. Switch 1236 is momentarily closed at the beginning of each integration cycle to empty integration capacitor 1232. Switch 1242 and switch 1257 are closed for the first cycle out of $K_1$ total integration averaging cycles in order to empty averaging capacitor 1240. In such an embodiment, $K_1$ is an integer selected to provide the desired amount of averaging. Further, for the first cycle switch 1236 is opened while switch 1242 remains closed for an extended period. Thus, averaging capacitor 1240 is precharged to a voltage close to the expected final value. Averaging capacitor 1240 may not be reset because the previous integrated voltage on averaging capacitor 1240 is typically near the final value. Not resetting and/or precharging averaging capacitor 1240 may allow faster noise settling rate and hence faster frame rates. During the next $K_1-1$ cycles switch 1242 is closed momentarily at the end of each integration period to perform the averaging operation from capacitor 1232 onto capacitor 1240.

Precharging aids in presettling the signal, for example were motion or scene changes are significant. However, in some embodiments, not resetting averaging capacitor 1240 may have an improved effect because precharging has uniformities imposed by capacitor variation and integration time adjustments. During motion of system 1200 or of targets, additional techniques to reduce blur and improve frame rate can also be utilized. Precharging allows the pixel voltage to settle closer to the new dynamically changing flux values. The ability to precharge averaging capacitor 1240 to close to its final value allows more rapid reduction of the noise on the circuits 1230 and 1250. This allows a faster frame rate out each stage of ROIC 1220. However, system 1200 can operate both utilizing precharging and without utilizing precharging. In some embodiments, the input circuit to integration capacitor 1232 may be a CTIA, buffered direct injection, source follower or other variant of input circuit. In such embodiments, averaging by capacitor 1240 and cascaded averaging circuit 1250 may still reduce noise.

Readout circuit 1230 and cascaded averaging circuit 1250 each has a settling time associated with both the noise and the ratio of the capacitance of the averaging capacitor 1240 or 1256 to the integration capacitor 1232 and 1240. In other words, the averaging capacitance divided by the integration capacitance affects the settling time for readout circuit 1230 and cascaded averaging circuit 1250. The settling time may be reduced using precharging. If IR detection system 1200 is desired to operate at high frame rate to reduce or prevent smear due to high platform motion, a small ratio of the averaging capacitance(s) to the integration capacitance(s) may be used. For slower more stationary imagery, such a fixed mounting or slow movements, a larger ratio of the averaging capacitance(s) to the integration capacitance(s) can be chosen. In some embodiment, the ratio of the capacitances of integration capacitor 1232 to averaging capacitor 1240 may be selected to match the flux of a lens, such as lens 1102, used with system 1200. In some embodiments, multiple capacitors can be utilized in place of single capacitors for the readout circuit 1230 and/or cascaded averaging circuit 1250. In such an embodiment, capacitor(s) may be selectively switched into a variable gain mode to allow a variable ratio of averaging capacitance(s) to integration capacitance(s). Even if signals are not fully settled before a particular number of integrations, system 1200 may still be utilized.

In some embodiments the fast frame output can be read from amplifier 1246 at the end of any number of cycles. Reading from amplifier 1246 may allow for adaptation to target speed while minimizing smear. In some embodiments, the output of amplifier 1246 can be used for simultaneous high dynamic range frames extending the upper level of dynamic range with periodic integration onto both the integration capacitor 1232 and averaging capacitor 1240 by keeping switch 1242 closed during a shorter integration time. For example, if $K_1=10$ fast frame cycles (number of integrations for integration capacitor 1232 before sampling) and $K_2=10$ cycles (number of integrations of integration capacitor 1254 before sampling), every full integrate cycle ($K_2$ cycles completed) corresponds to one hundred fast frame cycles. For high dynamic range if the integration time is reduced by a factor ten, then the total dynamic flux range is increased by a factor of ten for the shorter integration time. Thus, every one hundred cycles can have a high dynamic range integration inserted, with an integration time that is reduced by a factor of ten. In such an embodiment, the amount of additional high end dynamic range comes at a cost of just more than $\frac{1}{1000}^{th}$ additional time of integration within the $K_1$ and $K_2$ cycles. In some embodiments, this extends the dynamic range. The dual channel output (through amplifiers 1246 and 1258) make this readout possible. The high dynamic range settings may be cued by the output of additional averaging capacitor 1256.

In some embodiments, $K_1$ (the number of fast fame cycles/averages for fast readout circuit 123), $K_2$ (the number of cycles/averages for cascaded averaging circuit 1230), and/or integration times (e.g. operation switches 1242 and 1257) may be set dynamically. Thus, $K_1$ and $K_2$ may be selected to account for different motion conditions in such embodiments. For stationary imaging, with low expected motion, typically $K_1$ and $K_2$ may each be between 6-20 cycles. For motion, the $K_1$ and $K_2$ cycles may be shortened progressively to mitigate smear and blurring.

Use of readout circuit 1230 in conjunction with cascaded averaging circuit 1250 may greatly increase effective well capacity, allow the sensitivity for smaller pixels 1212 to approach and exceed that of larger pixels, provide higher resolution, improve national image interpretability rating scale (NIIRS), enhance contrast and improve minimum resolvable temperature difference (MRTD). For example, ROIC 1220 may allow both medium and small pixel sensors to achieve short integration times enabling framing rates in excess of 1000 FPS. In an embodiment where averaging capacitor 1240 is not reset, the output from averaging capacitor 1240 may achieve the sensitivity of a sensor with a much longer integration time without the added area requirement of a larger capacitor. For example by not resetting capacitor 1240 the noise on the output capacitor 1240 may settle over several milliseconds of averaging to a minimum noise floor. Although not shown, a lens having a low f-number analogous to lens 1102 may be utilized.

Cascaded averaging circuit 1250 may use much smaller capacitors and still achieve significant noise reduction. For example, a capacitance ratio of the additional integration capacitance of additional integration capacitor 1254 to the additional averaging capacitance of additional averaging capacitor 1256 of 8/80 may provide the same performance as a capacitance ratio of 2/20 in noise reduction while consuming only one-fourth the area. If a smaller set of capacitors is selected, the capacitor size is chosen to not increase the KTC noise associated with smaller capacitors. This lower area utilization allows multiple cascades of averaging in the pixel 1212 or nearby the pixel 1212 creating a very compact and highly effective noise averaging mechanism.

In some embodiments, high dynamic range (HDR) can be accomplished by using the dual outputs from amplifiers 1246 and 1258 sequentially. In such embodiments, operation of IR detection system 1200 may differ. For using HDR frame timing, one out of N frames may be utilized as follows. Averaging capacitor 1240 is reset with integration capacitor 1232 by closing switch 1236 before HDR integration begins. The readout circuit 1230 is configured with switch 1242 held closed during integration. When switch 1242 is closed during integration, the input capacitance is the sum of the capacitances of integration capacitor 1232 and averaging capacitor 1240. In some embodiments, this may be approximately nine multiplied by the integration capacitance of integration capacitor 1232. A very short integration time for very high flux signal capture is used (typically a few microseconds or less) may also be used. Pixel 1212 from amplifier 1246 are read out but are not mirrored over cascaded averaging circuit 1250. Averaging capacitor 1240 is reset with integration capacitor 1232 by momentarily closing switch 1236 after HDR integration ends and pixels are read out. Reset of the readout circuit 1230 after the HDR cycle prevents signals from the HDR cycle from mixing with the low dynamic range (LDR) signal cycles. For the remainder of frames 2 though N, normal operation is utilized for readout circuit 1230 and cascaded averaging circuit 1250. This may achieve LDR for normal background flux, in a manner described in the timing for FIG. 12D. Optional precharging of averaging capacitors 1240 and 1256 may be employed is based upon the required settling time and speed of targets and movement of the sensing platform. LDR signals may be read out from amplifier 1246 and/or amplifier 1258 following each cycle, depending on speed of targets and movement of the sensing platform. In another embodiment the HDR frame may be accomplished nearly simultaneously while maintaining LDR cycles in all N frames, by adding an independent HDR fast frame circuit that does not require the use of one of the normal or LDR averaging cycle frames.

Figure 14:
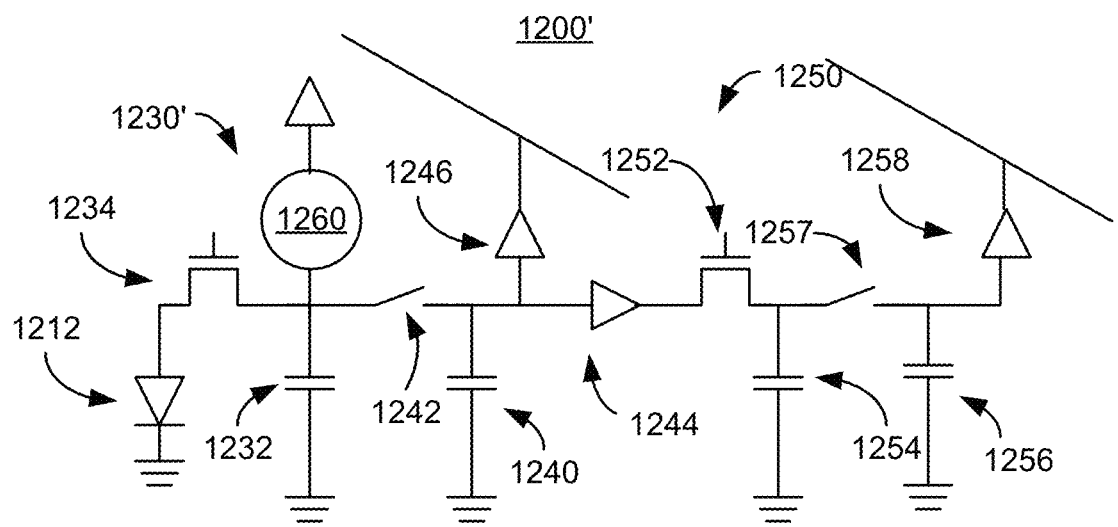
FIG. 14 depicts another embodiment of an infrared detection system including a cascaded averaging circuit and charge skimming.

FIG. 14 depicts another embodiment of IR detection system 1200' including charge skimming. IR detection system 1200' is analogous to IR detection system 1200 and thus includes analogous components and may have analogous benefits. In addition, readout circuit 1230' includes charge skimming module 1260. Charge skimming can be utilized to remove background charge. IR detection system 1200' also allows detectors, such as detector 1210 having pixel 1212, to work at higher dark current (Idark). Charge skimming in connection with multiple averages carried out in circuits 1230 and 1250 may achieve an improvement signal to noise. In some embodiments, this improvement may be by factor greater than nine. In some such embodiments, the improvement may be by a factor of greater than sixteen. Charge skimming of various types may be used to effectively subtract the excess dark current off of leaky detectors. IR detection system 1200', which utilizes small pixels 1212 and multiple averages in circuits 1230 and 1250, charge skimming allows for a higher dark current detector with precision charge skimming. Consequently, improvements in signal to noise levels may be obtained.

Charge skimming module 1260 may be a programmable current source, a switched capacitor charge subtraction, a resistive constant current connected to a voltage source, and/or other mechanism that may provide global or pixel by pixel current removal or skimming. Several methods may be deployed to accurately subtract off excess current that may be injected at the input node due to high excess dark current. In some embodiments, excess noise and residual fixed pattern noise may remain when utilizing charge skimming module 1260. The excess fixed pattern noise after charge skimming can be reduced to near the temporal noise floor. For example, a Scene Based Non Uniformity Correction (SBNUC) may reduce such noise. SBNUC running on output video from amplifier 1258 may in some embodiments reduce spatial noise by greater than a factor of sixty-four with three or more average capacitors (e.g. an additional cascaded averaging circuit not shown in FIG. 14). The use of the SBNUC may reduce the fixed pattern noise associated with drift, dark current changes, and 1/f noise. Moreover, IR detection system 1200' may allow for near room temperature detectors in some embodiments. For example, even if the dark current is significantly greater than the photocurrent from pixel 1212, the increase in the photocurrent induced shot noise may still be mitigated by readout circuit 1230 and cascaded averaging circuit 1250 of IR detection system 1200'.

Figure 15:
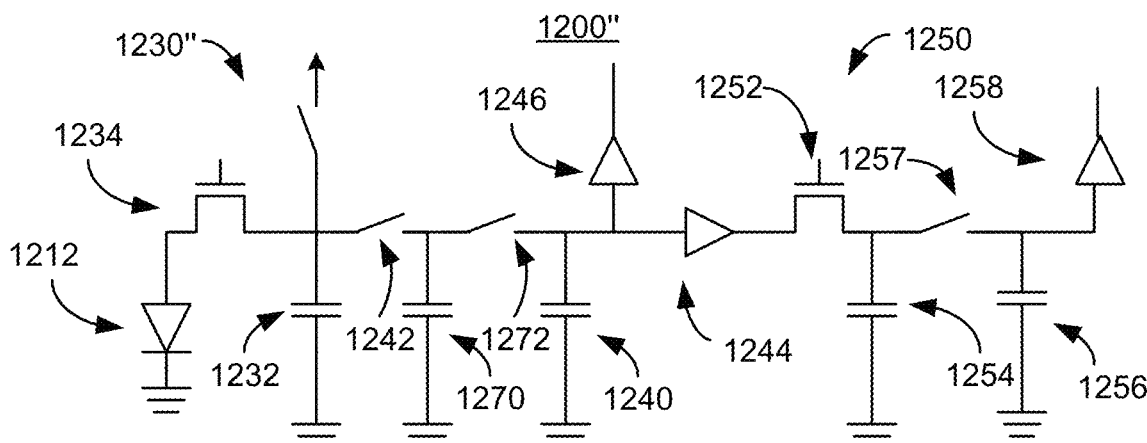
FIG. 15 depicts another embodiment of an infrared detection system including a cascaded averaging circuit and additional capacitors.

FIG. 15 depicts another embodiment of IR detection system 1200" including a cascaded averaging circuit and an additional capacitor. IR detection system 1200" is analogous to IR detection system 1200 and thus includes analogous components and may have analogous benefits. In addition, readout circuit 1230" includes an additional capacitor 1270 and corresponding switch 1272. Thus, readout circuit 1230' is a three capacitor readout circuit instead of a two capacitor readout circuit. Stated differently, instead of a single averaging capacitor 1240, two capacitors 1240 and 1270 are used. For IR detection system 1200", the first integration prior to noise averaging occurs on capacitors 1232 and 1270 together with switch 1242 closed. Integrating on capacitors 1232 and 1270 with switch 1242 closed and switch 1257 open allows the combined transimpedance gain to depend upon both capacitors 1232 and 1270 (e.g. $Z=q/(C_{apacitor\ 1232}+C_{apacitor\ 1270})$. For averaging, switch 1242 is opened and switch 1272 closed. Averaging occurs on the signal between capacitors 1232 and 1270. The integration-then-average process is repeated N times where multiple integration signals on capacitors 1232 and 1270 are then shared from capacitor 1270 to averaging capacitor 1240. Cascaded averaging circuit 1250 is analogous to and operates in an analogous manner to that described above. In other embodiments, cascaded averaging circuit 1250 might include three capacitors. In general, other numbers of capacitors can be used in readout circuit 1230 and/or cascaded averaging circuit 1250.

Readout at amplifier 1246 allows a higher effective well capacity for readout circuit 1230". However, in some embodiments this may be at the expense of a slower frame time (e.g. time to complete $K_1$ cycles). For example, in some embodiments, the frame time may exceed 1 millisecond. Thus, reducing smearing in highly dynamic vibration and moving targets may be more challenging. In some cases, the three capacitor circuit of 1230" can provide improved sensitivity at the expense of slower total averaged integration time. As discussed above, smaller capacitances having the same capacitance ratio may be used in cascaded averaging circuit 1250 while achieving analogous noise reduction.

Figure 16:
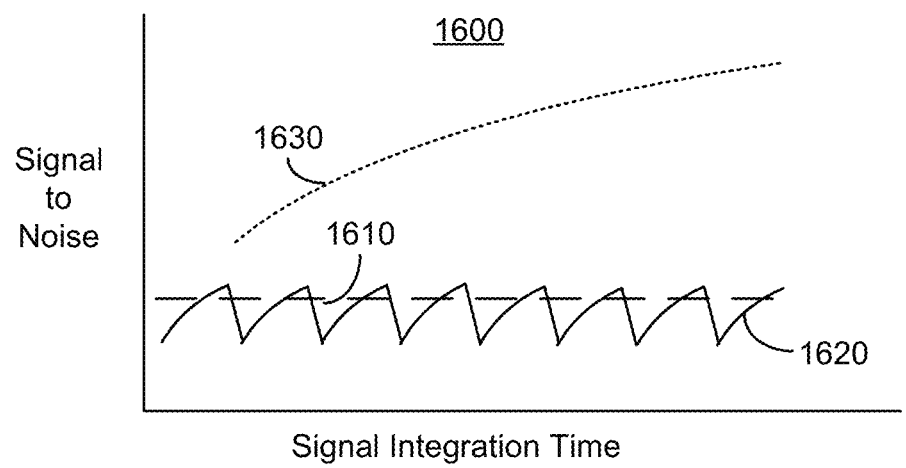
FIG. 16 is a graph illustrating exemplary evolution of noise reduction in an embodiment of an infrared detection system including a cascaded averaging circuit.

FIG. 16 is a graph 1600 illustrating exemplary evolution of noise reduction in an embodiment of an infrared detection system including a cascaded averaging circuit and utilizing small pixels. Thus, FIG. 16 is discussed in the context of IR detection system 1200. Dashed line 1610 indicates the signal to noise ratio with a single capacitor (not shown). Solid line 1620 indicates the single-to-noise for signals output on amplifier 1246, after averaging by capacitor 1240. Dotted line 1630 indicates the signal-to-noise for signals output on amplifier 1258, after averaging by capacitors 1240 and 1256. This signal to noise improvement occurs when the reset is applied to 1240 each full frame. Thus, a noise improvement may be provided for signals output on amplifier 1246. However, a significant improvement may be achieved for signals provided from averaging capacitor 1256.

Figure 17:
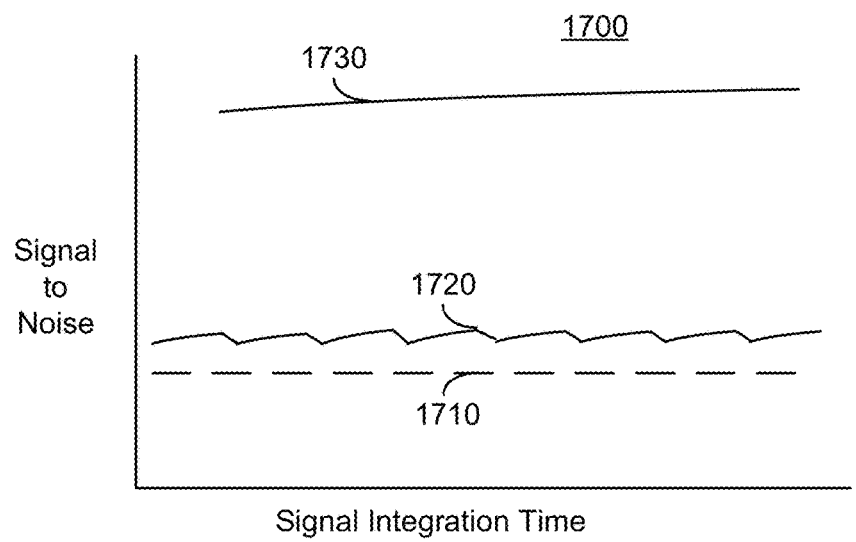
FIG. 17 is a graph illustrating exemplary signal-to-noise ratios for an infrared detection system including a cascaded averaging circuit versus other infrared detection systems.

FIG. 17 is a graph 1700 illustrating exemplary signal-to-noise ratios for an IR system including a cascaded averaging circuit when the capacitor 1240 is not reset each frame. Thus, FIG. 17 is discussed in the context of IR detection system 1200. Dashed line 1710 indicates the signal to noise ratio with a single capacitor (not shown). Solid line 1720 indicates the single-to-noise for signals output on amplifier 1246, after averaging by capacitor 1240. Dotted line 1730 indicates the signal-to-noise for signals output on amplifier 1258, after averaging by capacitors 1240 and 1256. Thus, as IR detection system 1200 continues to average down noise over many frames or many milliseconds when averaging capacitor 1240 is not reset each frame read, further settled noise improvements may be achieved. Not resetting averaging capacitors allows achieving low noise for pixels which average continuously over frame boundaries in the scene where the pixels have very little incident power change over several frames. The noise reduction by each stage of IR detection system 1200 varies when the sensor is moving with respect to the targets. The most dynamic conditions of varying scene flux may require "presetting" the signal values with the first averaged frame in an averaging sequence. These conditions may also allow a very low noise floor for pixels in scenes which have very little incident power change. However, the multiple averages in the circuits 1230 and 1250, allows the noise to settle to the lower level. Thus, as previously indicated, IR detection system 1200 may provide lower noise levels.

Figure 18:
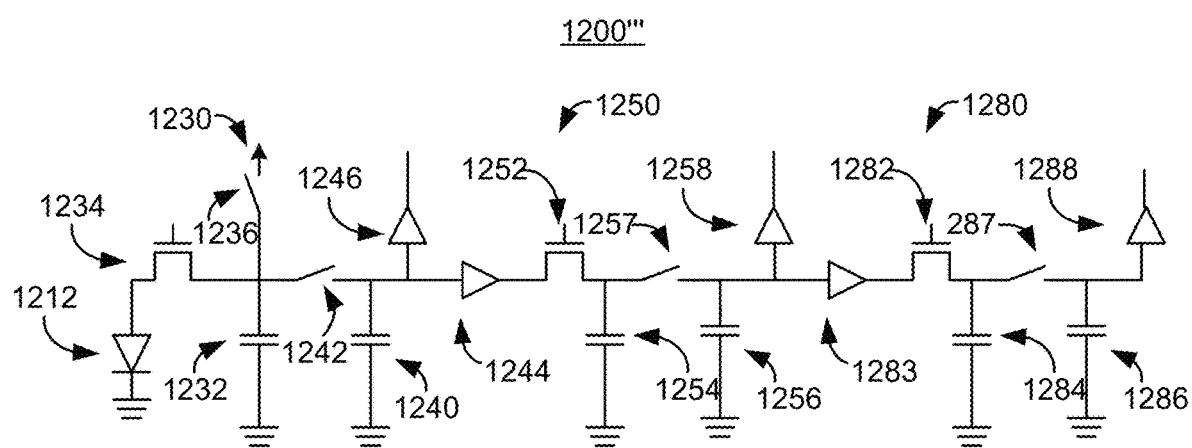
FIG. 18 depicts another embodiment of an infrared detection system including multiple cascaded averaging circuits.

FIG. 18 depicts another embodiment of IR detection system 1200''' including multiple cascaded averaging circuits. IR detection system 1200' is analogous to IR detection system 1200 and thus includes analogous components and may have analogous benefits. In addition, IR detection system 1200''' includes a second cascaded averaging circuit 1280. Cascaded averaging circuit 1280 includes transistor 1282, input amplifier 1283, integration capacitor 1284, averaging capacitor 1286, switch 1287 and output amplifier 1288. Cascaded averaging circuit 1280 is analogous to cascaded averaging circuit 1250 and operates in a similar manner. Thus, more than two stages of averaging capacitors may be used in an IR detection system. The additional stage(s), such as cascaded averaging circuit 1280, may be utilized for additional noise averaging. In some embodiments, the input to each successive stage is driven and may settle in less than one microsecond. Consequently, multiple stages may be used for achieving even faster frame rates at the input to the pixel. Multiple stages might also be used to drive down noise, for example from very high leakage detectors. Because of the compactness, a three or more stage cascade FPA detection system, such as IR detection system 1200' may be developed for smaller pixel. Because of the compactness and multiplexing, all the components may reside near the pixel.

IR detection system 1200''' may include a first very high gain state integration readout circuit 1230, followed by the first cascaded averaging circuit 1250 and then second cascaded averaging circuit 1280. Transistors 1252 and 1282 may act as the access switches or multiplexers to time the signal averaging with the proper cells during scanning of the inputs/outputs of each stage of IR detection system 1200'''. Cascaded averaging circuit 1280 uses integration capacitor 1284 and averaging capacitor 1286. Switch 1287 allows integration capacitor 1284 to average onto averaging capacitor 1286. The outputs via amplifiers 1246, 1258 and 1288 may have dedicated multiplexed outputs, may have 2 outputs which are switched or shared, or may have one output that is switched or multiplexed. Thus, analogous benefits to those described above may be provided by IR detection system 1200'''.

Figure 19:
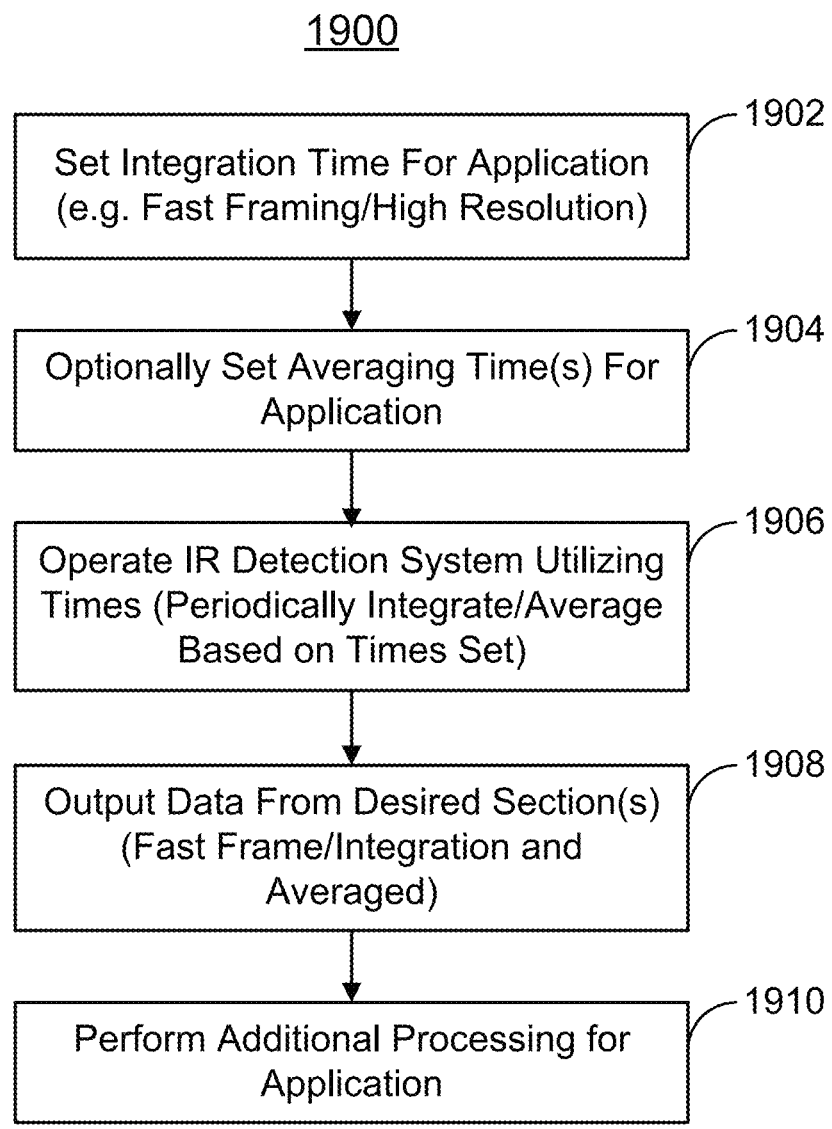
FIG. 19 is a flow chart depicting an embodiment of a method for utilizing an infrared detection system.

FIG. 19 is a flow chart depicting an embodiment of method 1900 for utilizing an infrared detection system. Method 1900 may include substeps. In addition, in some embodiments, steps and/or substeps may be performed in another order, including in parallel. Further, although described in the context of single pixel, method 1900 may extended to multiple pixels in a detector array. For example, the pixels in the detector may be raster scanned, portions method 1900 may be carried out for each pixel and the output used to provide a video readout or still image.

The integration time for a readout of a pixel is set, at 1902. The integration time selected may be based upon the size of the integration capacitor, light background, collection optics, as well as other factors such as whether fast framing and/or high resolution are desired for the pixel. For example, if a bright source is sensed in the image being captured, the integration time may be adaptively reduced or increased to provide an unsmeared representation of the image and readout to an external processor. For example, in some embodiments, integration times of 200 microseconds or less may be set at 1902. Integration times of one hundred microseconds or less may be used in some cases. In some embodiments, the number of cycles for which integration is carried out (e.g. $K_1$) is also set at 1902. The number of cycles may increase with decreasing integration time. Thus, the frequency at which the charge at the integration capacitor is provided to the averaging capacitor of a readout circuit is determined at 1902.

In some embodiments, the number of averaging cycles and total averaging time(s) are set at 1904. The averaging time corresponds to the number of integration cycles that are averaged by cascading averaging circuit(s). For multiple cascaded averaging circuits, multiple averaging times may be set at 1904. Thus, the frequency at which the charge at an averaging capacitor of a particular circuit is provided to the integration capacitor of a next circuit is determined at 1904.

The IR detection system is operated using the integration times and averaging times, at 1906. Thus, the signal from the pixel(s) are provided to the corresponding readout circuit, the signal at the integration capacitor is provided to the averaging capacitor, the signal at the averaging capacitor is provided to a subsequent stage, and the output of the averaging capacitor(s) is read at 1906. In some embodiments, 1906 may include precharging one or more of the capacitors used.

In addition, data are output from the desired sections of the IR detection system, at 1908. For example, the averaging capacitor for the readout circuit and/or the averaging capacitor(s) for cascaded averaging circuit(s) may be sampled at 1908. This sampling may occur at different frequencies for different outputs. Thus, both faster readout and lower noise/further averaged signals may be output depending on which tap(s) of video from circuit is selected. Additional processing of the output signal may be performed, at 1910. This processing may depend upon the application for which the IR detection system is used. Thus, using method 1900, the benefits of the IR detection systems described herein may be realized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting at least one projectile track in at least one image, each of the at least one projectile track crossing multiple pixels in each of the at least one image, the at least one projectile track corresponding to at least one projectile;

translating the projectile track to a traceback path, the traceback path including a known location and a projectile origin, wherein the translating of the projectile track to the traceback path comprises:
  identifying at least one image plane normal to an optical axis and corresponding to the at least one image, each of the at least one projectile track being represented in the at least one image plane by a line segment;
  determining a plurality of intercepts for the line segment of each of the at least one projectile track;
  defining a projectile plane for the line segment of each of the at least one projectile track, the projectile plane including the known location and the plurality of intercepts; and
  determining an intersection of the projectile plane with a ground plane for the line segment of each of the at least one projectile track, the intersection corresponding to the traceback path for each of the at least one projectile; and
capturing the at least one image with at least one infrared detection system, each of the at least one infrared detection system including a lens, a photodetector pixel array, and a plurality of readout circuits, the photodetector pixel array including a plurality of pixels and receiving a photo signal from the lens, a readout circuit of the plurality of readout circuits including an integration capacitor and an averaging capacitor, the integration capacitor being coupled with a pixel of the plurality of pixels; and at least one cascaded averaging circuit coupled with the averaging capacitor.

2. The method of claim 1, wherein the known location is a camera location.

3. The method of claim 1, further comprising:
overlaying the traceback path for each of the at least one projectile track on a topographical map.

4. The method of claim 1, further comprising:
determining a projectile plane rotation and a projectile plane pitch from a direction parallel to the optic axis.

5. The method of claim 4, wherein the determining the projectile plane rotation and the projectile plane pitch further includes:
correcting for at least one of a camera pitch, camera roll and a camera yaw.

6. The method of claim 1, wherein the at least one image includes a plurality of images.

7. The method of claim 6, wherein the plurality of images include a first image captured at a first time and a first location and a second image captured at a second time different from the first time and at a second location different from the first location, a first traceback path corresponding to the first image and a second traceback path corresponding to the second image providing the projectile origin.

8. The method of claim 1, wherein the plurality of pixels has a pitch of less than ten micrometers.

9. A system comprising:
a processor configured to:
detect at least one projectile track in at least one image, each of the at least one projectile track crossing multiple pixels in each of the at least one image, the at least one projectile track corresponding to at least one projectile;
translate the projectile track to a traceback path, the traceback path including a known location and a projectile origin, wherein the translating of the projectile track to the traceback path comprises to:
  identify at least one image plane normal to an optical axis and corresponding to the at least one image, each of the at least one projectile track being represented in the at least one image plane by a line segment;
  determine a plurality of intercepts for the line segment of each of the at least one projectile track;
  define a projectile plane for the line segment of each of the at least one projectile track, the projectile plane including the known location and the plurality of intercepts; and
  determine an intersection of the projectile plane with a ground plane for the line segment of each of the at least one projectile track, the intersection corresponding to the traceback path for each of the at least one projectile; and
capture the at least one image with at least one infrared detection system, each of the at least one infrared detection system including a lens, a photodetector pixel array, and a plurality of readout circuits, the photodetector pixel array including a plurality of pixels and receiving a photo signal from the lens, a readout circuit of the plurality of readout circuits including an integration capacitor and an averaging capacitor, the integration capacitor being coupled with a pixel of the plurality of pixels; and at least one cascaded averaging circuit coupled with the averaging capacitor; and
a memory coupled with the processor, wherein the memory is configured to provide the processor with instructions.

10. The system of claim 9, wherein the known location is a camera location.

11. The system of claim 9, further comprising:
overlaying the traceback path for each of the at least one projectile track on a topographical map.

12. The system of claim 9, wherein the processor is further configured to:
determine a projectile plane rotation and a projectile plane pitch from a direction parallel to the optic axis, wherein to determine the projectile plane rotation and the projectile plane pitch, the processor is further configured to correct for at least one of a camera pitch, camera roll and a camera yaw.

13. The system of claim 9, wherein the at least one image includes a first image captured at a first time and a first location and a second image captured at a second time different from the first time and at a second location different from the first location, a first traceback path corresponding to the first image and a second traceback path corresponding to the second image providing the projectile origin.

14. The system of claim 9, wherein the plurality of pixels has a pitch of less than ten micrometers.

15. A computer program product, the computer program product being embodied in a non-transitory tangible computer readable storage medium and comprising computer instructions for:
detecting at least one projectile track in at least one image, each of the at least one projectile track crossing multiple pixels in each of the at least one image, the at least one projectile track corresponding to at least one projectile;
translating the projectile track to a traceback path, the traceback path including a known location and a projectile origin, wherein the translating of the projectile track to the traceback path comprises:
  identifying at least one image plane normal to an optical axis and corresponding to the at least one image, each of the at least one projectile track being represented in the at least one image plane by a line segment;

determining a plurality of intercepts for the line segment of each of the at least one projectile track;

defining a projectile plane for the line segment of each of the at least one projectile track, the projectile plane including the known location and the plurality of intercepts; and determining an intersection of the projectile plane with a ground plane for the line segment of each of the at least one projectile track, the intersection corresponding to the traceback path for each of the at least one projectile; and capturing the at least one image with at least one infrared detection system, each of the at least one infrared detection system including a lens, a photodetector pixel array, and a plurality of readout circuits, the photodetector pixel array including a plurality of pixels and receiving a photo signal from the lens, a readout circuit of the plurality of readout circuits including an integration capacitor and an averaging capacitor, the integration capacitor being coupled with a pixel of the plurality of pixels; and at least one cascaded averaging circuit coupled with the averaging capacitor.

* * * * *